(12) United States Patent
Tsurushima et al.

(10) Patent No.: US 6,270,400 B1
(45) Date of Patent: Aug. 7, 2001

(54) DOOR MECHANISM FOR AUTOMOBILE AIR CONDITIONER

(75) Inventors: Akihiro Tsurushima; Takumi Ijichi; Katsuhiro Kurokawa, all of Tochigi (JP); Toshiya Uchida, Novi, MI (US); Masaharu Onda, Tochigi (JP)

(73) Assignee: Calsonic Dansei Corporation, Tokyo (JP)

( * ) Notice: Subject to any disclaimer, the term of this patent is extended or adjusted under 35 U.S.C. 154(b) by 0 days.

(21) Appl. No.: 09/284,025

(22) PCT Filed: Feb. 6, 1998

(86) PCT No.: PCT/JP98/00505

§ 371 Date: Apr. 6, 1999

§ 102(e) Date: Apr. 6, 1999

(87) PCT Pub. No.: WO98/34804

PCT Pub. Date: Aug. 13, 1998

(30) Foreign Application Priority Data

Feb. 6, 1997 (JP) .................................................. 9-24029
Feb. 6, 1997 (JP) .................................................. 9-24031

(51) Int. Cl.[7] .................................................. B60S 1/54
(52) U.S. Cl. .................... 454/121; 454/126; 454/156; 454/160; 454/161
(58) Field of Search .................. 454/156, 139, 454/121, 159, 160, 161, 126

(56) References Cited

U.S. PATENT DOCUMENTS

| 5,203,737 | * | 4/1993 | Joseph et al. | 454/139 |
| 5,643,079 | | 7/1997 | Miyata et al. | 454/139 |
| 5,699,851 | | 12/1997 | Saida et al. | 165/42 |
| 5,701,949 | | 12/1997 | Yamaguchi et al. | 165/42 |
| 5,899,262 | * | 5/1999 | Yamaguchi et al. | 165/42 |
| 6,062,298 | * | 5/2000 | Lee | 165/42 |

FOREIGN PATENT DOCUMENTS

| 59-124721 | 8/1984 | (JP) . |
| 62-110512 | 5/1987 | (JP) . |
| 8-276723 | 10/1996 | (JP) . |
| 8-290714 | 11/1996 | (JP) . |
| 9-193645 | 7/1997 | (JP) . |

* cited by examiner

*Primary Examiner*—Jiping Lu
(74) *Attorney, Agent, or Firm*—Foley & Lardner

(57) ABSTRACT

A mix door D, which is arranged in a limited space defined between an upstream air passage 10 in which an evaporator 3 is installed and a downstream air passage 11 in which a heater core 4 is installed, is of a sliding type. By guiding a door proper 12 by using a cam groove, a seal member 15 bonded to the door proper 12 is pressed against a contacting member 13 only when the door proper 12 assumes its close position. Smoothed operation of the door proper 12 is achieved with a compact construction of a unit, and sealing and temperature controlling performance is increased.

12 Claims, 13 Drawing Sheets

DOOR MECHANISM FOR AUTOMOBILE AIR CONDITIONER

TECHNICAL FIELD

The present invention relates to a door mechanism of an automotive air conditioning device, which can slide in a limited space to control air flow.

TECHNICAL BACKGROUND

In general, an automotive air conditioning device comprises an intake unit for introducing outside and inside air, a cooler unit for cooling the introduced air and a heat for heating the introduced air, these three units being combined in series and installed in a limited space of a vehicle cabin, such as a space defined below an instrument panel.

However, due to the in-line connection of the three units, the automotive air conditioning device is compelled to have an enlarged size. Thus, when such device is mounted in a small car, the smaller vehicle cabin space is further limited, which is undesirable.

In view of the above, as is shown in FIG. 18, there has been proposed a device in which a cooler unit 1 and a heater unit 2 are positioned close to each other and aligned along a fore-and-aft direction of the vehicle thereby to reduce not only a longitudinal size "L" of the vehicle but also a lateral size of the same. Furthermore, in this device, for reduction of size, the distance between an evaporator 3 and a heater core 4 is reduced and a mix door (which will be referred to as just "door" hereinafter) 5 for producing cooler and/or warmer air is reduced in size.

As is known, the evaporator 3 is a device through which a low temperature low pressure[]refrigerant, which flows in a refrigerating cycle, flows for producing a cooled air by conducting a heat exchange between the refrigerant and an induced air. While, the heater core 4 is a device through which a highly heated engine cooling water flows for producing a heated air by conducting a heat exchange between the cooling water and an induced air.

Denoted by numeral 6 in the drawing is a defroster door which, in a defrosting mode, opens a defroster opening 6a for defrosting a window, denoted by numeral 7 is a ventilation door which, in a ventilation mode, opens a ventilation opening 7a for blowing a cooled air against an upper part of a passenger, and denoted by numeral 8 is a foot door which, in a foot mode, opens a foot opening 8a for blowing a warmed air toward the upper part of the passenger.

However, in the unit having the above-mentioned construction, the reduction in size of the door 5 tends to cause a difficulty with which distribution of cooled air and warmed air is controlled. Thus, in some devices, as is illustrated by a broken line in the drawing, an auxiliary door 5a is provided for controlling the amount of air led to the heater core 4. However, in this case, the addition of such auxiliary door causes a complicated and highly costing construction, which is of course undesirable.

Accordingly, recently, there has been proposed, as is shown in FIG. 19, a much compact automotive air conditioning device (see Japanese Utility Model Provisional Publication 6-71222).

In the device, for achieving the compact construction, a cooler unit 1 and a heater unit 2 are integrated, and an evaporator 3 and a heater core 4 are positioned close to each other. That is, since the mix door 5 pivoting about a rotation axis 5b needs a relatively larger mounting space, a flat plate door 9 (the door shown in the drawing comprises two doors 9a and 9b which are connected through pins pa and pb to a door actuating mechanism comprised of a link mechanism) is employed, the flat plate door being slid up-and-down along a rail 9c for effecting the temperature control.

However, a door mechanism possessed by the above-mentioned vertically sliding type tends to show weak points in operability and sealing performance. That is, in order to prevent air leakage around the door 9, it is needed to remove or minimize a clearance between the rail 9c and the door 9. However, if the clearance is too small, the sliding resistance become increased causing non-smoothed movement of the door 9. This undesired phenomenon equally occurs even if a sealing member is arranged between the door 9 and the rail 9c. While, if, for achieving a smoothed movement of the door, a larger clearance is provided between them, the undesired air leakage tends to occur. That is, in this case, antinomic matters take place.

In a door mechanism of a slide door type wherein, like the door 9 described in the above-mentioned publication, a plate type door is slid, it is difficult to achieve a satisfied sealing. That is, although a sealing needed when a linearly running door comes to a terminal position is adequately achieved by only putting a seal member between the door and a member to which the door contacts, permanent deformation of the seal member takes place instantly because the flat seal member is pressed each time the door is actuated. In view of this, it is difficult to keep an adequate sealing for a long time. That is, even when the door comes to the terminal position that is, close position, undesired air leakage tends to occur in relatively early time, and thus, if such slide type door is used as the mix door, the temperature control performance is inevitably lowered due to the poor sealing.

While in a case wherein, like the above-mentioned door 9, the sliding mechanism is composed of a link mechanism, the connection between the pin and the link tends to produce a play upon operation of the door. When the door is applied with a certain pressure, noises caused by the play tend to be produced which are transmitted to the vehicle cabin to make passengers uncomfortable.

The present invention is provided for eliminating the above-mentioned drawbacks possessed by the conventional techniques. That is, a first object of the invention is to provide an excellent door mechanism of an automotive air conditioning device, which is compact in size, smoothly operable, superior in sealing performance and temperature control performance and suppressed from producing noises.

Furthermore, in the automotive air conditioning devices of these days, there has been developed a type which has a so-called fresh-ventilation mode and can blow a cooled air into the vehicle cabin from a ventilation opening when needed.

The automotive air conditioning device of this type comprises, as is shown in FIG. 20, a conventionally constructed automotive air conditioning device which includes an outside air intake opening 161, an inside air intake opening 162, an intake unit 160 having a fan F and a motor 164 installed therein, a cooler unit 101 having an evaporator 103 (viz., part constituting part of a refrigerating cycle) installed therein and a heater unit 102 including a heater core 104 through which engine cooling water flows, a mix door D, a bypass passage B, a warmed air passage H and a mix chamber E, and further comprises a cooled air passage 114 through which the cooled air passing through the evaporator 103 is directly led to a ventilation duct 116.

Accordingly, when a fresh ventilation door 122 for opening and closing the cooled air passage 114 is opened, a cooled air is blown into the vehicle cabin from ventilation openings 121a and 121b which faces the vehicle cabin. Accordingly, in this case, it is possible to direct the cooled air against only the face of a driver for an adequate time, which makes the driver feel comfortable.

Apart from the above, automotive air conditioning devices belong to a device which is usually installed in a limited space, such as interior of an instrument panel. Thus, bulky structure of the device makes installation in a motor vehicle, particularly in a smaller motor vehicle difficult. Accordingly, for the need of reducing the device mounting space in the vehicle, various attempts have been made for reducing the size of the device.

However, in automotive air conditioning devices having the above-mentioned conventional fresh ventilation mode, a separate cooled air passage connecting to the ventilation duct must be provided to the conventional automotive air conditioning device. That is, in the devices, it is necessary to prepare a structure by which the passage is defined as well as separate parts, which causes an increase in cost and a need for a certain space for mounting therein the separate parts.

The present invention is provided for eliminating the above-mentioned drawbacks possessed by the conventional techniques. That is, a second object of the present invention is to provide an automotive air conditioning device which can possess a fresh ventilation mode irrespective of its simple, lower cost and compact construction.

DISCLOSURE OF THE INVENTION

In order to achieve the above-mentioned first object, the present invention provides, an automotive air conditioning device including one upstream side air passage, two downstream side air passages branched from the upstream side passage, a door having a predetermined size and arranged to select one of the two downstream side air passages for feeding the air flow from the upstream side air passage thereto or to distribute the air flow to both the downstream side air passages at a given ratio, and movement limiting structures arranged at upstream and downstream sides of the door near the door, a door mechanism of said automotive air conditioning device, the door mechanism being characterized in that the door comprises a door proper which is arranged between the movement limiting structures and extends in a direction to shut the air flow from the upstream side air passage and a seal member which is bonded to one surface of the door proper, the door proper being capable of sliding in a direction to shut the air flow with the aid of a sliding mechanism, the sliding mechanism having a rack and pinion type of arrangement wherein a gear (pinion) is meshed with a toothed portion (rack) on the door proper, so that when, upon operation of a driving device, the gear is driven, the door proper is slid in the sliding direction and when the door proper comes to a terminal end of the sliding path, the door proper is moved in a direction angled to the sliding direction, so that the seal member is contacted to and pressed against a contacting member formed on a case which has the air passages defined therein.

With this arrangement, for example, in case wherein the door is used as a mix door which is arranged to distribute the cooled air to both a heater-core installed passage and a bypass passage bypassing the heater core, the door proper arranged between the movement limiting structures located between the upstream side passage and the two downstream side passages can slide in a direction to shut the air flow. Accordingly, the dimension of the door proper in the direction along which the air flow can be reduced, which brings about compact construction of the unit. Furthermore, since, at the terminal end of the sliding path, the door proper can change its way in a direction angled to the sliding direction, sealing is carried out while pressing the seal member. Thus, sealing of the door proper at the terminal end of the sliding path is improved and the temperature controlling performance in a condition wherein the door proper takes its middle position is improved. Furthermore, since the sliding mechanism is of a gear driving and driven type, smoothed operation of the mechanism and easy handling of the door are obtained and no noises are produced.

A door mechanism of an automotive air conditioning device according to a second aspect of the invention includes two upstream side air passages, a downstream side air passage, a door having a predetermined size and arranged to selectively lead the air flow from one of the two upstream side air passages to the downstream side air passage and movement limiting structures arranged at upstream and downstream sides of the door, said door mechanism being characterized in that the door comprises a door proper which is arranged to between the movement limiting structures and extends in a direction to shut the air flow from said upstream side air passages and a seal member which is bonded to one surface of said door proper, the door proper being capable of sliding in a direction to shut the air flow with the aid of a sliding mechanism, the sliding mechanism having a gear meshed with a toothed portion of the door proper, so that when, upon operation of a driving device, the door proper is slid in the sliding direction and when the door proper comes to a terminal end of the sliding path, the door proper is moved in a direction angled to the sliding direction, so that the seal member is contacted to and pressed against a contacting member formed on a case which has the air passages defined therein.

With this arrangement, for example, in case wherein the door is used as an intake door which selectively introduces the vehicle interior air (viz., inside air) outside air and/or the vehicle outside air (viz., outside air), the door proper arranged between the movement limiting structures located between the two upstream side passages and the downstream side passage can slide in a direction to shut the air flow. Accordingly, the dimension of the door proper in the air flow direction can be reduced, which permits compact construction of the unit. Furthermore, since, at the terminal end of the sliding path, the door proper can change its way in a direction angled to the sliding direction, sealing is carried out while pressing the seal member, and thus, sealing of the door proper at the terminal end of the sliding path is improved. Furthermore, since the sliding mechanism is of a gear driving and driven type, smoothed operation of the mechanism and easy handling of the door are obtained, and no noises are produced.

A door mechanism of an automotive air conditioning device has such a feature that the sliding mechanism comprises cam grooves which are formed on both side surfaces of the case which has the air passages defined therein and a plurality of guide members provided on one side of the door proper and slidably received in the cam grooves, each of the cam grooves having at a terminal end portion a portion by which the corresponding guide member is guided in a direction angled to the sliding direction of the door proper, and the seal member being pressed against the contacting member when the door proper comes to the terminal end portion.

With this arrangement, the door proper can be driven along the cam grooves formed in both sides of the case. Thus, the door proper never produces play even when applied with wind pressure. Furthermore, since the cam grooves help the seal member to press against the contacting member through the door proper, protection against undesired lowering in sealing performance provided over a long time, which means improvement in sealing.

The invention has such a feature that the gear of the sliding mechanism has higher teeth which are higher than other teeth, so that when the driving device drives the gear, the higher teeth press the sealing member against the contacting member through a toothed portion formed on the door proper.

With this arrangement, by the higher teeth formed on the gear, a certain pressure can be applied to the door proper, so that the sealing member can be pressed against the contacting member. Thus, lowering in sealing performance can be suppressed for a long time, which means improvement in sealing.

The invention has such a feature that said door proper is supported by a supporting roller which is fixed and positioned at a laterally middle portion of the door proper, the supporting roller resiliently contacting the door proper.

With this arrangement, even if the door proper becomes deformed by a certain degree under the influence of heat from the evaporator and the heater core which are positioned near the door proper and/or the door proper is applied with a certain wind pressure, the deformation of the door can be prevented or minimized and thus satisfied door movement is achieved. Even if the sliding mechanism employs the gears, undesired gear slippage never occurs under operation of the gears and thus smoothed operation is achieved.

The invention has such a feature that the door proper has an arcuate cross section so that the door proper is can contact the gear driven by the driving device.

With this arrangement, smoothed operation of the gears is achieved due to the nature of the gears. Furthermore, even when the door proper is arranged to shut the air flow, the air flow distribution performance and air guiding performance of the door proper are increased when the door proper is flexed toward the upstream direction of the air flow. Furthermore, air flow resistance is reduced and if the door proper is flexed toward the downstream direction of the air flow, the air guiding performance is increased.

The invention has such a feature that the air passages are provided by coupling a pair of case members having the door proper put therein, and that the air passages have, at a downstream portion of the door proper and at a middle portion of the path along which the door proper slides, a center connecting portion by which the case members are connected.

With this arrangement, the middle portion of the sliding path constitutes a dead space. The paired case members can be combined by using the dead space, and the strength of the case can be increased. Furthermore, in comparison with a case wherein a separate connecting member is used for connecting the case members, marked reduction in air flow resistance is achieved in the invention. Furthermore, satisfied air flow stability and satisfied temperature controlling performance are achieved.

The invention has such a feature that the supporting roller is connected to the center connecting portion.

With this arrangement, during the process when the paired case members are being to be combined, the supporting roller can be installed. Furthermore, since the installation of the supporting roller is achieved by using a dead space inevitably produced at a middle portion of the door sliding path, effective usage of the space is accomplished.

The invention, which establishes the above-mentioned second object, has such a feature that a door mechanism of an automotive air conditioning device comprises a heater core for heating air introduced from outside and inside of a motor vehicle; a hot air passage which extends through the heater core; a bypass passage which bypasses the heater core; a mix door which adjusts the rate between the amount of air directed to the bypass passage and that of air directed to the hot air passage; a mixing chamber which mixes the air coming thereto from the bypass passage and the air coming from the hot air passage; a ventilation opening to which a ventilation duct connected to the mixing chamber is connected, the ventilation opening being arranged to blow air against an upper portion of a passenger in the vehicle cabin; a ventilation door equipped with a pivot axis and arranged to open and close the ventilation opening; a defroster opening connected to the mixing chamber, the defroster opening being arranged to blow air against a front glass window; a defroster door equipped with a pivot shaft and arranged to open and close the defroster opening; a contacting portion to which opposed ends of the ventilation and defroster doors contact when the ventilation and defroster openings are closed by the doors, the opposed ends being the ends of the doors which are opposite to the ends of the door to which the pivot shafts are connected; and a cooled air passage through which the introduced air is led to the ventilation duct without passing through the hot air passage and the bypass passage, the cooled air passage including a hollow portion defined in the contacting portion, the contacting portion having a ventilation duct connecting opening through which said hollow portion and the ventilation duct are connected. In this invention, since the door contacting portion to which the free ends of the ventilation door and the defroster door are contactable has the hollow portion defined therein, part of the cooled air flow coming from the upstream portion of the air passage is led, through the hollow portion and the ventilation duct connecting opening, into ventilation duct.

The invention has such a feature that the ventilation door has on its upper surface a projected portion which closes the ventilation duct connecting opening when the ventilation door closes the ventilation opening. In this invention, the ventilation duct connecting opening is opened and closed by the ventilation door per se. That is, when the ventilation opening is closed by the ventilation door, it never occurs that cooled air having passed through the evaporator in the cooled air passage is directly blown into the vehicle cabin. While, when the ventilation door is opened, cooled air is assuredly led to the vehicle cabin through the cooled air passage.

The invention has such a feature that, in the automotive air conditioning device as defined in FIG. 9, the ventilation duct connecting opening is located at a position which is concealed or covered by the end portions of the ventilation door when the ventilation opening is closed by the ventilation door. In this invention, with a simple construction, the ventilation duct connecting opening can be opened and closed by the ventilation door per se.

The invention has such a feature that, in the automotive air conditioning device as claimed in claim 9, the ventilation duct connecting opening and the ventilation opening have a common center axis along which air flows, and that the length of the ventilation duct connecting opening measured in a direction perpendicular to the common axis is smaller than that of the ventilation opening. In this invention, the cooled air flow having passed through the cooled air passage and the ventilation duct connecting opening is mainly blown toward a center portion of the vehicle cabin.

The invention has such a feature that, in the automotive air conditioning device as defined in claim 9, a case is provided, the case being constructed by coupling first and second cases at vertically dividing surfaces of the same, the vertically dividing surfaces extending along the air flow direction and passing through the ventilation duct connecting opening. In this invention, only by forming rectangular recesses in the vertically dividing surfaces of the cases and mating the vertically dividing surfaces, the ventilation duct connecting opening is easily provided.

In the invention the space defined between the upstream side air passage and the branched two downstream side air passages, where the movement limiting member is located, there is provided the sliding type door, and the seal member bonded to the door proper is pressed against the contacting member only when the door proper assumes the close position. Accordingly, compact construction is achieved, and sealing and temperature controlling are improved, and smoothed operation is achieved. Handling of the door is easily made without producing noises, which provides the operator with a pleasant door handling.

In the space defined between the two upstream side air passages and the downstream air passage, where the movement limiting member is located, there is provided the sliding type door, and the seal member bonded to the door proper is pressed against the contacting member only when the door proper assumes the close position. Accordingly, compact construction is achieved and sealing is improved. Furthermore, smoothed operation is achieved, and handling of the door is easily made without producing noises, which provides the operator with a pleasant door handling.

In the invention, the movement of the door proper is guided along the cam grooves. Accordingly, the door does not rattle even when applied wind pressure. Furthermore, since the cam grooves help the sealing member to be pressed against the contacting member through the door proper, lowering in sealing performance is suppressed for a long time and thus sealing performance is increased.

In the invention, the higher teeth of the gear press the door proper for pressing the sealing member against the contacting member. Thus, lowering in sealing performance is suppressed for a long time, and thus, the sealing performance is increased.

In the invention, the door proper is not deformed even when applied with marked wind pressure. Furthermore, irrespective of usage of gears in the sliding mechanism, undesired slippage of teeth does not occur, and thus, smooth operation is achieved.

In the invention, smoothed operation, satisfied air flow distribution and satisfied air guiding are achieved. Furthermore, reduction in air flow resistance is expected.

In the invention, the paired case members are coupled with effective usage of the dead space inevitably produced by the door. Thus, the strength of the case is increased and reduction is air flow resistance is achieved. Furthermore, due to the satisfied air flow directional stability, the temperature controlling of the air is improved.

In the invention, during the process when the paired case members are being to be combined, the supporting roller can be installed. Furthermore, since the installation of the supporting roller is achieved by using a dead space inevitably produced at a middle portion of the door sliding path, effective usage of the space is accomplished.

In the invention, part of the cooled air flow coming from the upstream portion of the air passage is led through the hollow portion in the door contacting portion and the ventilation duct connecting opening, into the ventilation duct. Accordingly, a simple, low cost, compact, strong and highly sealed automotive air conditioning device having a fresh ventilation mode can be provided.

In the invention, the ventilation duct connecting opening can be opened and closed by the ventilation door per se. Thus, there is no need of providing a separate door which opens and closes the cooled air passage.

In the invention, with a much simpler construction, the ventilation duct connecting opening can be opened and closed by the ventilation door per se.

In the invention, the cooled air flow having passed through the cooled air passage and the ventilation duct connecting opening is mainly blown to a center portion of the vehicle cabin.

In the invention, only by forming rectangular recesses in the vertically dividing surfaces of the cases and mating the vertically dividing surfaces, the ventilation duct connecting opening is easily provided. Accordingly, molds for molding the case can have a simple structure.

BEST MODE EMBODIMENT OF THE INVENTION

In the following, embodiments of the present invention will be described with reference to the accompanying drawings.

EMBODIMENT-1

Figure 1:
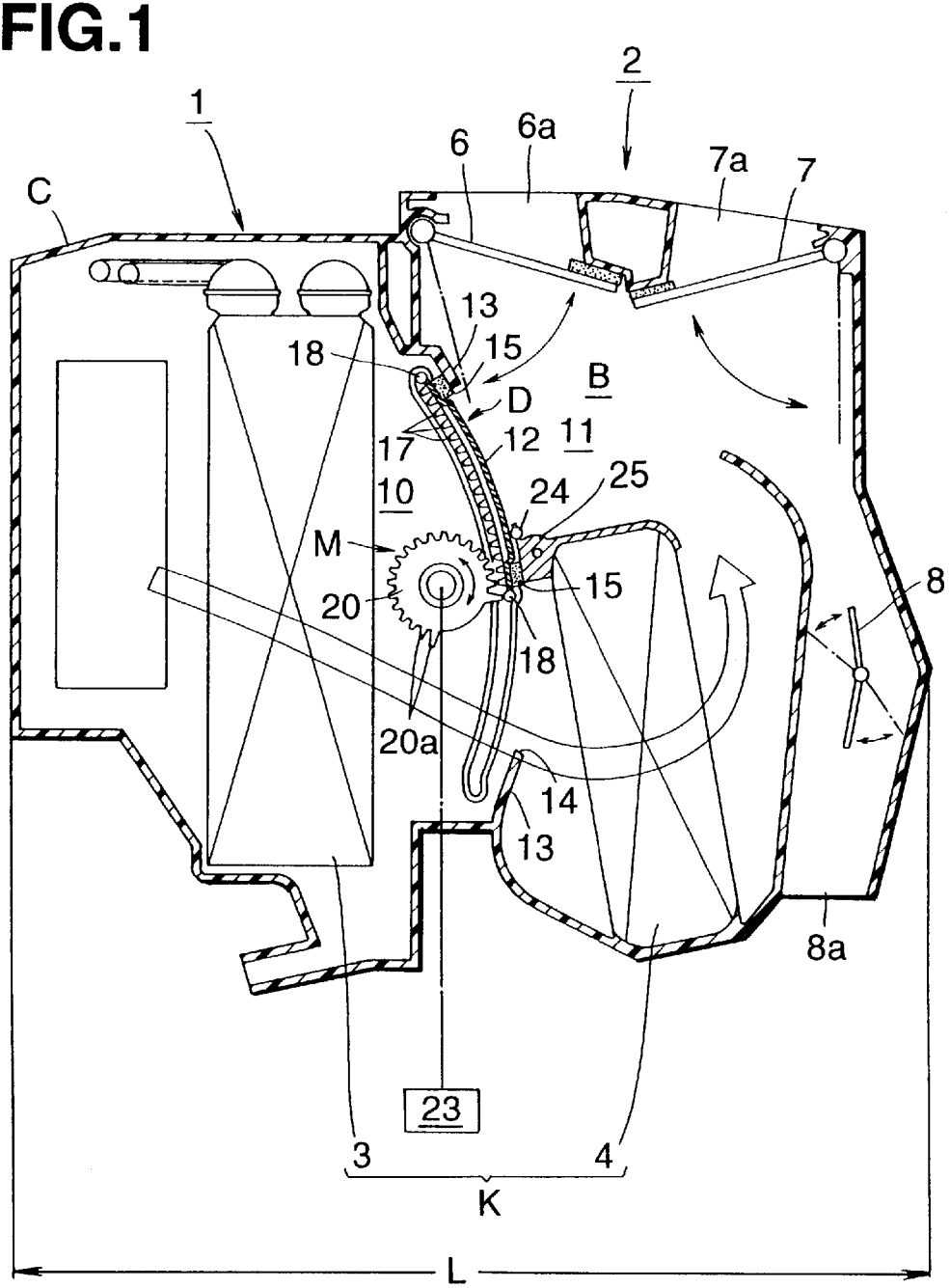
FIG. 1 is a sectional view of a first embodiment of the invention.
Figure 2:
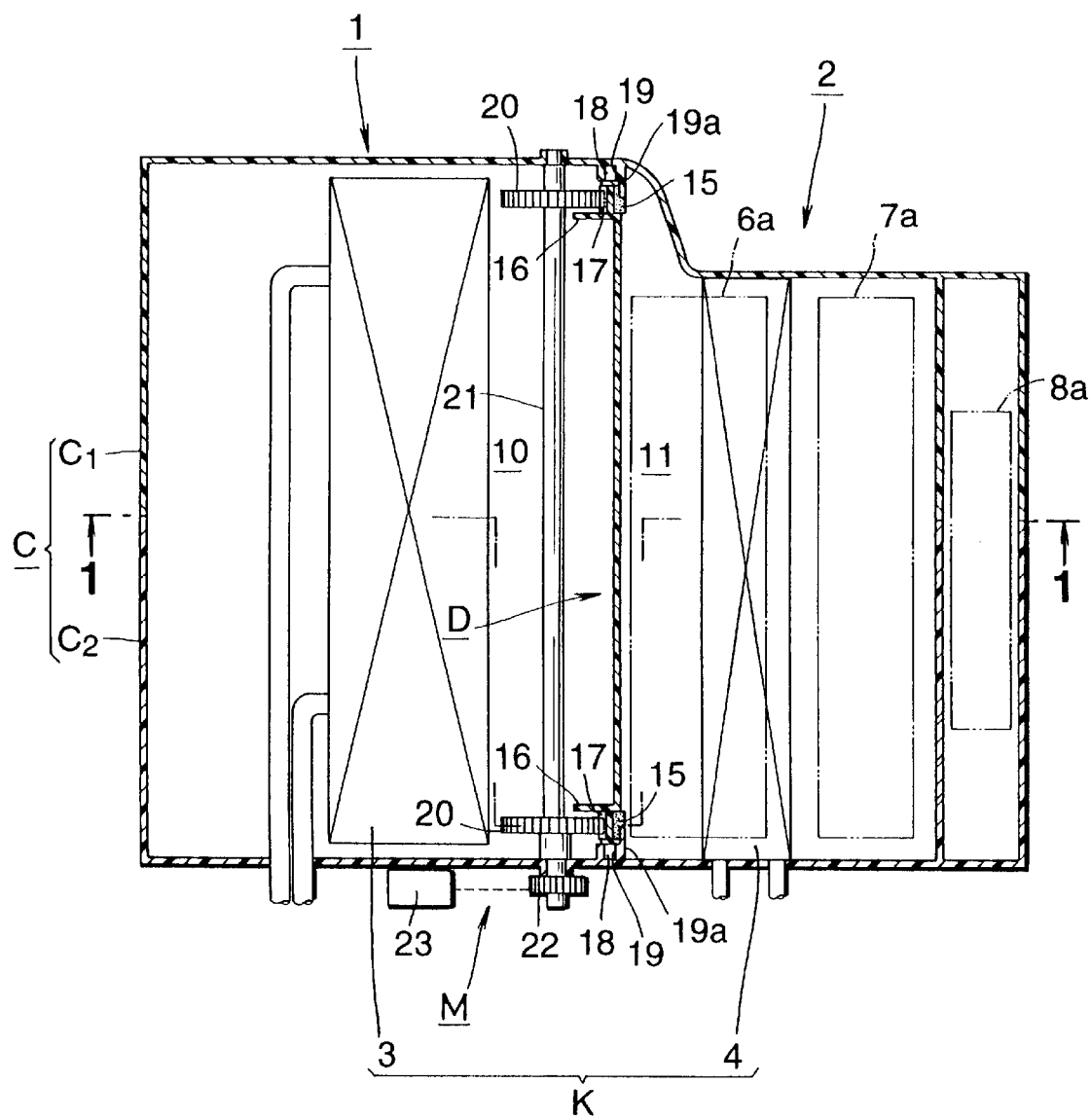
FIG. 2 is a plan view of FIG. 1.
Figure 3:
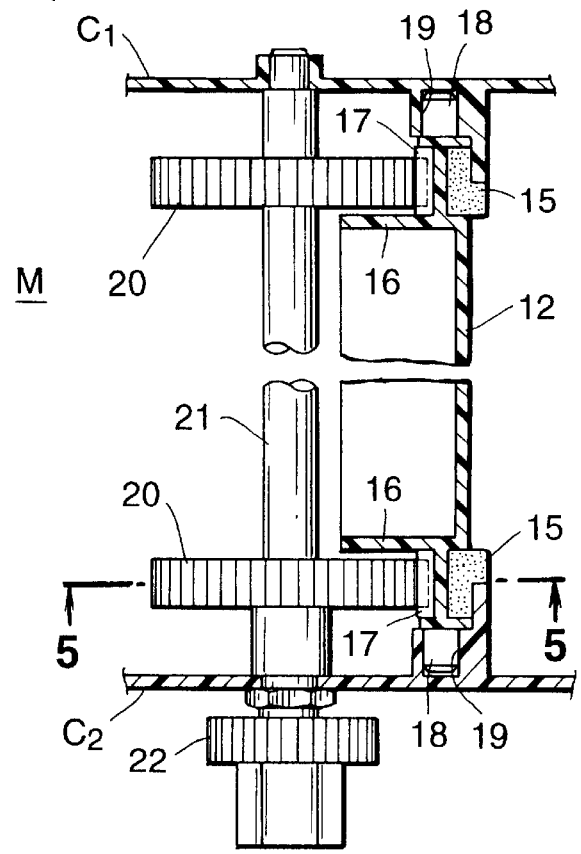
FIG. 3 is a horizontally sectional view of a door mechanism.
Figure 4:
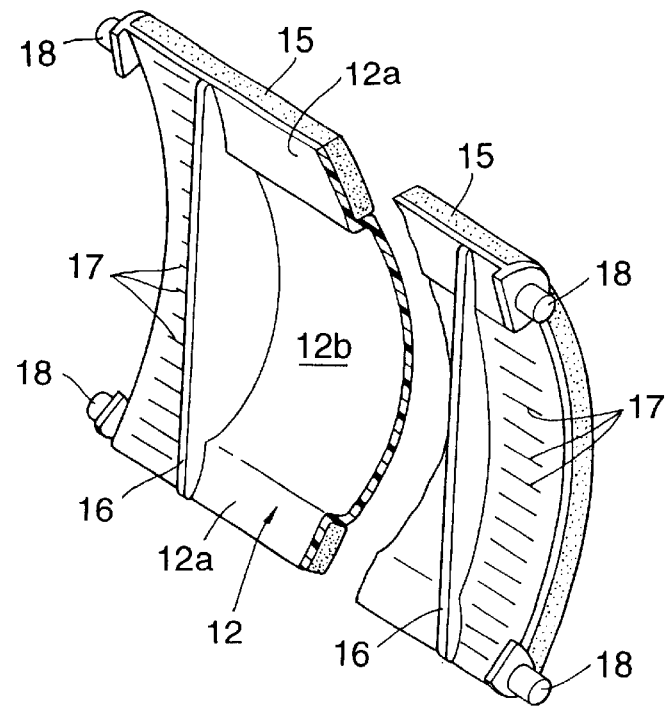
FIG. 4 is a partially cut schematic perspective view of a door.
Figure 5:
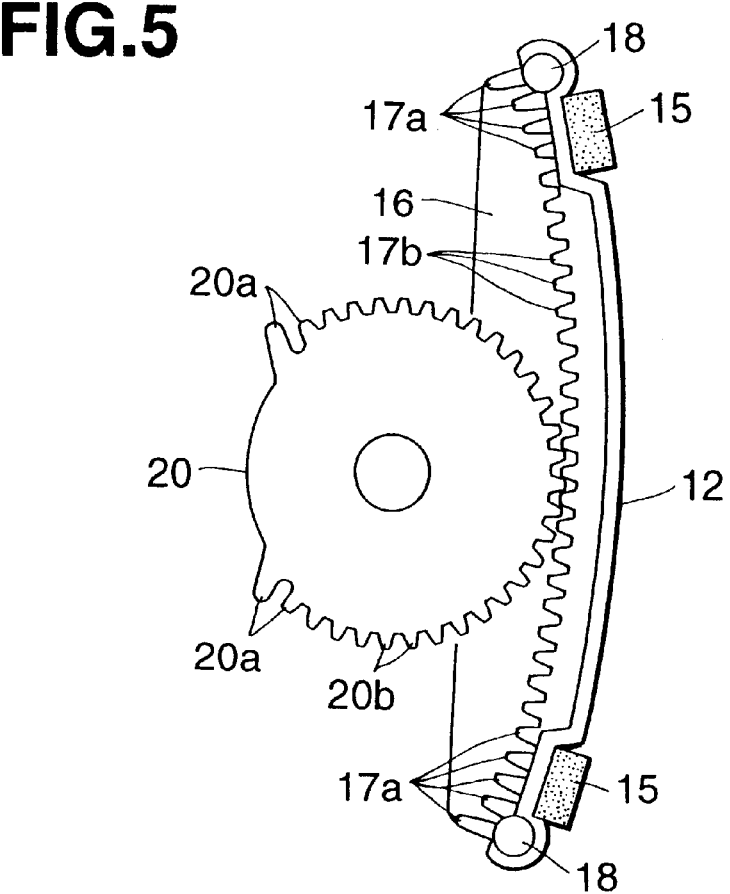
FIG. 5 is an end view taken along the line 5—5 of FIG. 3.
Figure 6:
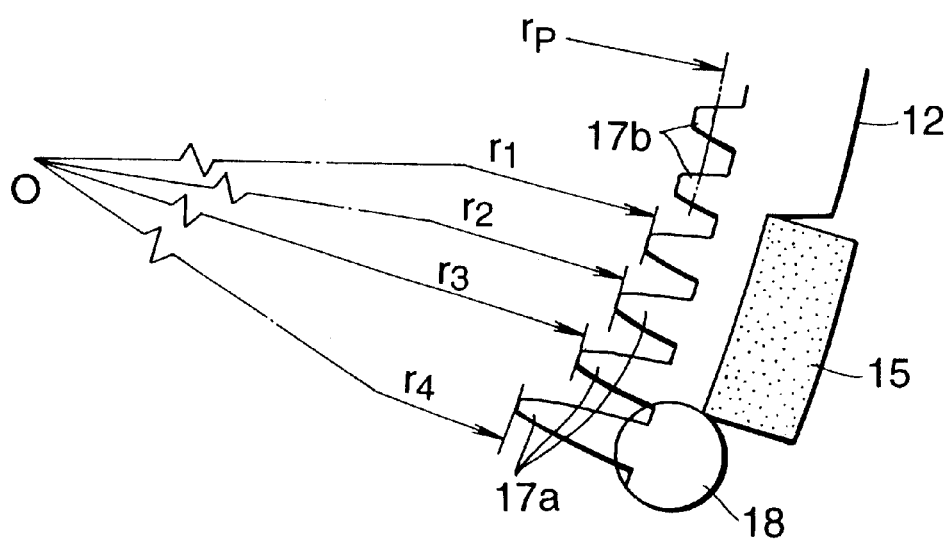
FIG. 6 is an enlarged illustration of an essential part of the door.
Figure 7:
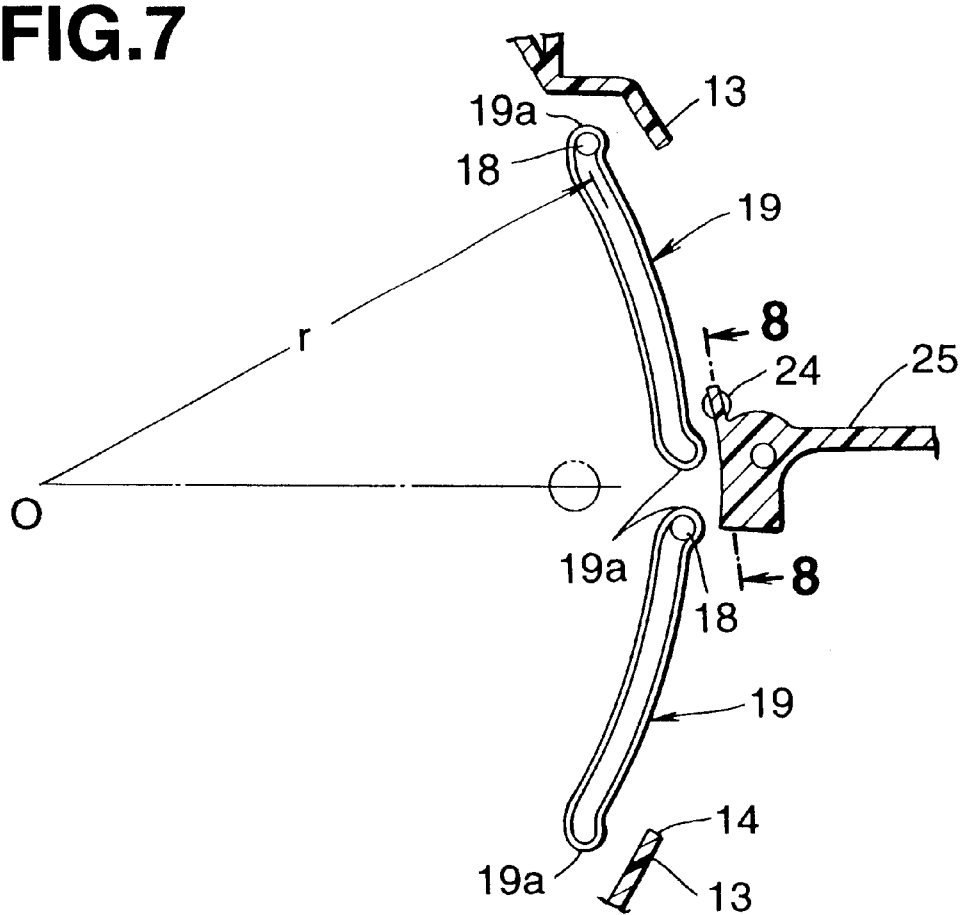
FIG. 7 is an illustration of a cam groove.
Figure 8:
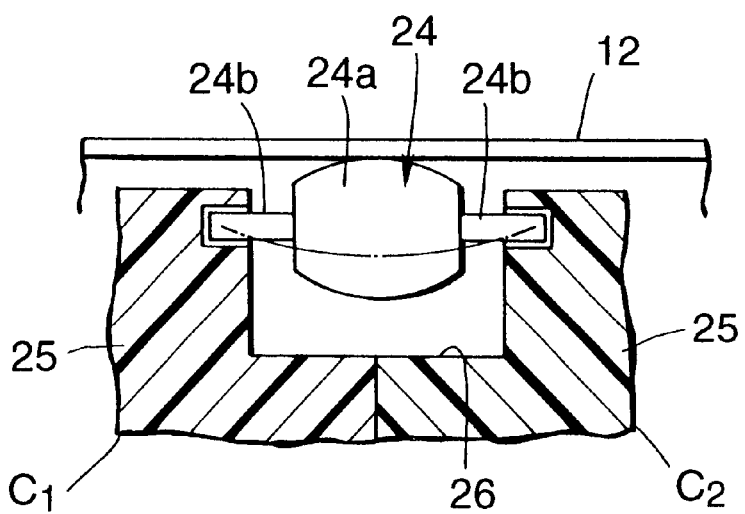
FIG. 8 is a sectional view of a supporting roller.
Figure 18:
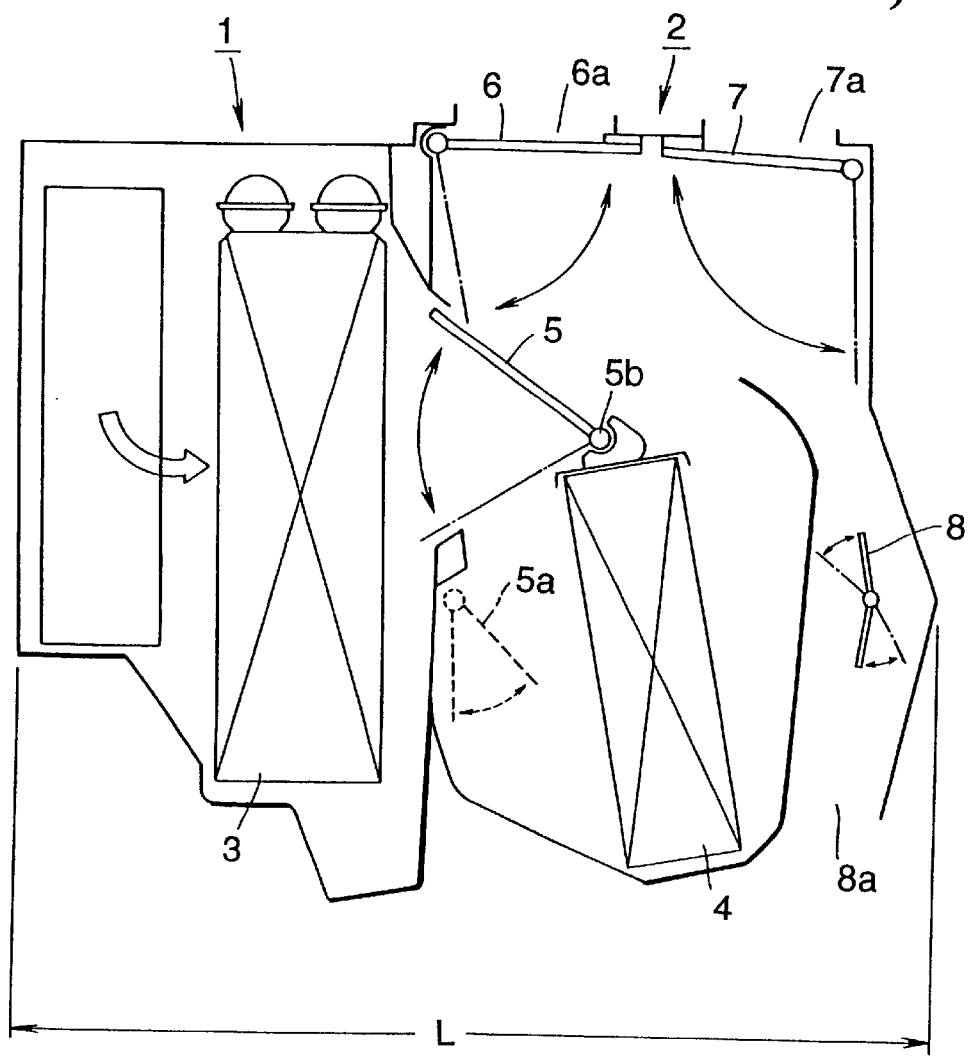
FIG. 18 is a sectional view of a conventional automotive air conditioning device.
Figure 19:
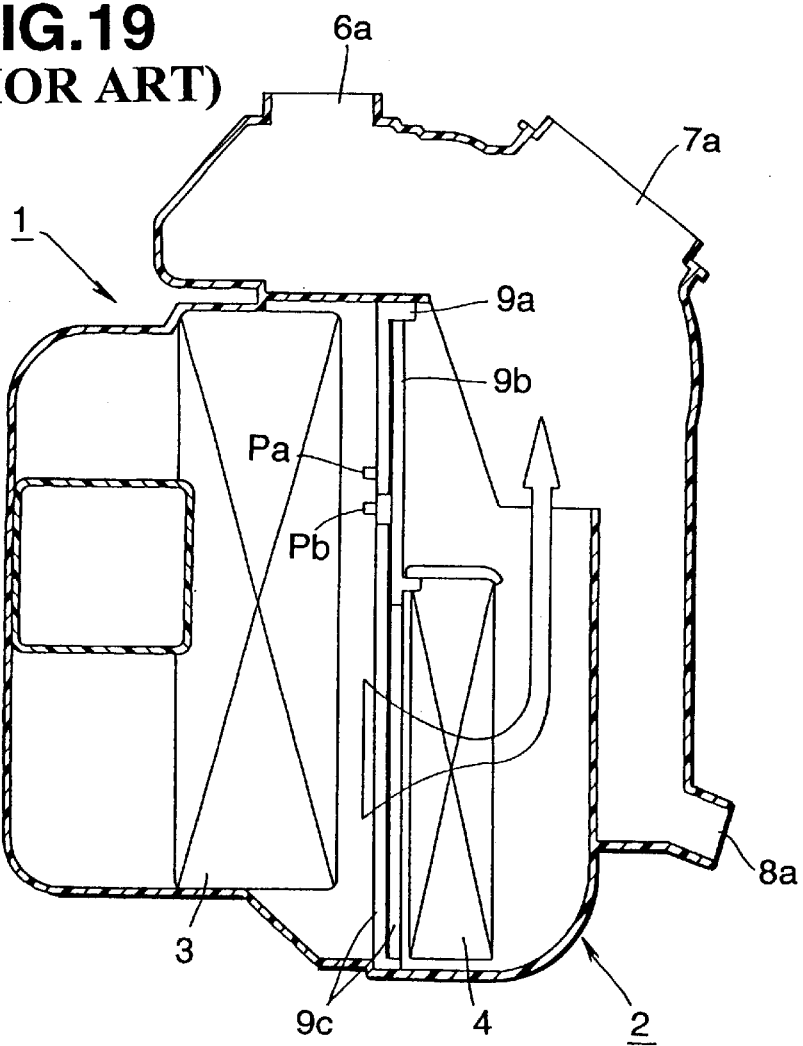
FIG. 19 is a sectional view of another conventional automotive air conditioning device.

FIG. 1 is a drawing showing an automotive air conditioning device which is an embodiment-1 of the present invention, which is a sectional view taken along the line 1—1 of FIG. 2. FIG. 2 is a plan view of FIG. 1, FIG. 3 is a horizontally sectional view of a door mechanism, FIG. 4 is a partially cut perspective view of a door, FIG. 5 is an end view taken along the line 5—5 of FIG. 3, FIG. 6 is an enlarged illustration showing an essential portion of the door, FIG. 7 is an illustration showing a cam groove portion, and FIG. 8 is an illustration of a supporting roller, which is a sectional view taken along the line 8—8 of FIG. 7. It is to be noted that parts similar and corresponding to those of FIGS. 18 and 19 are denoted by the same reference numerals as those of FIGS. 18 and 19.

As is shown in FIG. 1, a door mechanism of an automotive air conditioning device of the embodiment-i is applied to a mix door.

As is shown in FIG. 1, in the automotive air conditioning device, there is used a case C which comprises a cooler unit 1 and a heater unit 2 which are aligned along a longitudinal axis of an associated motor vehicle and coupled in such a manner as to reduce a longitudinal length "L". In upstream and downstream portions 10 and 11 of an air passage 10 defined in the case C, there are installed an evaporator 3 and a heater core 4, respectively.

The air passages 10 and 11 are formed by coupling a pair of case members C1 and C2 in a so-called face-to-face connecting manner. During this coupling, after-mentioned door proper 12, the above-mentioned evaporator 3 and the heater core 4 are put into the case and held therein.

In the air passages 10 and 11, a door D is installed at a position between the evaporator 3 and the heater core 4. By sliding the door D by using a slide mechanism M, the air flow from the upstream passage 10 is selectively led toward the passage of the heater core 4 or to a bypass passage B which bypasses the heater core 4, or divided into two flows at a certain distribution ratio, one being directed to the passage of the heater core 4 and the other being directed to the bypass passage B.

At the upstream and downstream sides of the door D, the evaporator 3 and the heater core 4 are closely arranged, which will be referred to as movement limiting structures "K" in the following description because they restrict a free movement of the door D.

In the following, the door D and the slide mechanism M will be described in detail.

The door D comprises a door proper 12 which extends across the passage between the evaporator 3 and the heater core 4 in a direction to shut the air flow from the upstream air passage 10.

As is shown in FIG. 1, the vertical length of the door proper 12 is about half that of an opening 14 defined between the upstream air passage 10 and the downstream air passage 14, and as is seen from FIG. 2, the lateral length of the door proper is generally equal to the distance between opposed sides of the case C.

As shown in FIG. 4, the door proper 12 comprises an outer side flat portion 12a and an inner dome-shaped swelled portion 12b. An outer surface of the outer side flat portion 12a is lined with a seal member 15 made of urethane foam or the like. If desired, outer and inner surfaces of the swelled portion 12b may be lined with seal members 15.

At laterally spaced portions of the door proper 12, there are provided respective reinforcing plates 16 which reinforce the door proper 12 and have a function to guide air flow. The portion defined between each reinforcing plate 16 and one lateral end of the door proper 12 is shaped arcuate. The arcuate end portion is formed with vertically extending teeth 17 which are meshed with a gear 20 of an after-mentioned drive device 23.

At four corners of the door proper 14, there are provided projected guide rollers 18 which are rotatably and slidably received in after-mentioned guide cam grooves 19 which are formed in ridges projected inward from an inside wall of the case C. If desired, fixed cylindrical pins may be used in place of the guide rollers 18.

Although the door proper 12 illustrated is shaped arcuate to operatively engage with the gear 20 driven by the drive device 23, the arcuate shape may be convex not concave with respect to the direction in which air flows, as is shown. In case wherein the shape is convex, the air distribution performance is improved, the air guide performance for guiding air toward the heater core 4 and the bypass passage B is also improved and the flow resistance against the air flow is reduced. While, in case wherein the shape is concave, the shape contributes to guiding the air flow toward the heater core 4 and the bypass passage B without causing marked resistance against the air flow, and thus, the guiding performance to the air flow is much improved.

Especially, in the sliding type door D, not only reduction in size of the unit is achieved but also the direction of the air flow (viz., wind axis) is kept unchanged, that is, not varied irrespective of any opening position which the door D takes.

That is, in the conventional one wherein the door is rotated about its rotation axis, the direction of the air flow is largely changed by the door it-self in accordance with the opening degree of the door and thus the wind axis is varied, and thus, as a result, the mixing of the cooled air and the warmed air tends to induce an unexpected condition. This tendency sometimes brings about a need of a temperature control lib and/or changing of the shape of the case proper, for the purpose of obtaining a desired temperature control. However, in the sliding type door D, the air flow is smoothly changed and thus the wind axis is kept unchanged.

When the wind axis is kept unchanged, it is possible to layout the parts with respect to the air flow directed to each air blowing opening. And when the layout is practically applied to the arrangement of the mix door, it is possible to hit the cooled air flow and the warmed air flow against each other at a certain angle and thus stable air mixing is possible. Furthermore, since it is only necessary to take measures against the wind distribution and air mixing based on the wind axis oriented to the given direction, smoothed air flow distribution and desired temperature controlling are obtained. Thus, the air flow distribution and the air mixing can be improved without provision of a temperature controlling rib and change of the shape of the case.

As is shown in FIG. 3, the slide mechanism M for operating the door D comprises cam grooves 19 formed in ridges on an inner wall of the case C, a pair of partial gears 20 meshed with toothed portions 17 formed on the surface of the door D, a shaft 21 connecting the partial gears 20, a drive gear 22 fixed to an end of the shaft 21 and a drive device 23 (see FIGS. 1 and 2), such as a motor and a motor actuator, which drives the drive gear 22. If desired, in place of the drive device 23, a manually operated mechanism connected to a controller through a wire cable may be used.

As is shown in FIG. 7, the guide cam grooves 19 are each shaped to have a radius of curvature "r" substantially equal to that of the door D and support or movably receive the four guide rollers 18 of the door proper 12, so that the door D is assuredly operated without play even if applied with a certain wind pressure. The guide cam grooves 19 are arcuate in shape and arranged at upper and lower portions of each inner wall. The upper guide rollers 18 are engaged with the upper guide cam grooves 19 and the lower guide rollers 18 are engaged with the lower guide cam grooves 19. An outer terminal end 19a of each cam groove 19 is so oriented that when the door proper 12 comes to its terminal position, the outer terminal end is directed toward a direction angled to the sliding direction of the door proper, that is, in the illustrated embodiment, the outer terminal end extends obliquely rearward from the end portion of the arcuate sliding path.

With this orientation of the path, the seal member 15 is forced to contact with a partition wall 13 and pressed against the same to enhance the sealing performance. The seal member 15 is not a member which constantly contacts the partition wall 13, but a member which contacts the partition wall 13 when really needed. Accordingly, the sealing performance of the seal member can be kept for a long period, and thus, the assured sealing is expected for a long period. Furthermore, substantially no friction is produced when the door is actuated, which lowers the force needed for actuating the door. In the illustrated embodiment, the contacting member 13 to which the sealing member 15 contacts is the partition wall 13 of the case C. However, if desired, the contacting member 13 may be a separate member which is separate from the case.

In the illustrated embodiment, each of the cam grooves 19 comprises separate upper and lower portions. However, the present invention is not limited to such an arrangement. That is, any other arrangement may be employed so long as, at the terminal position of the door, the guide roller 18 is permitted to move in a direction angled to the sliding direction of the door. That is, for example, an arrangement may be used wherein the terminal ends 19a of the upper and lower cam grooves 19 are connected. If this arrangement is employed, molding the case C with a plastic is much easily carried out.

The above-mentioned sliding mechanism M comprises the cam grooves 19, the paired partial gears 20, the shaft 21 and the drive gear 22. If desired, these parts and the door D may be pre-assembled as a single unit. The single unit is then put into the case C through an opening formed in a side wall of the case C and installed therein. In this case, depending on the types of the air conditioning devices, various kinds of units can be prepared, so that mounting of automotive air conditioning devices to vehicles is achieved with some essential parts commonly used.

Each of the partial gears 20 has a unique shape for the purpose of causing the door proper 12 to be directed at the terminal position thereof in a direction angled to the sliding direction of the door. That is, as is seen from FIG. 5, each partial gear 20 has enlarged or higher teeth 20a at end portions thereof, which are higher than other teeth 20b of the gear. That is, when the partial gear 20 is driven by the above-mentioned drive device 23, the higher teeth 20a press the door proper 12 through the toothed portion 17 of the door proper 12 and move the door proper along the cam grooves 19.

As is seen from FIGS. 5 and 6, each of the toothed portions 17 possessed by the door proper 12 has higher teeth 17a at upper or lower end portions thereof, which are higher than other teeth 17b of the toothed portion. That is, as is seen from FIG. 6, the heights of the higher teeth gradually change in accordance with a change of the distances, viz., r1, r2, r3 and r4, between the tops of the teeth and a rotation center O. With this, the higher teeth 17a are assuredly meshed with the higher teeth 20a of the partial gear 20, so that the door proper 12 is assuredly driven along the cam grooves 19. Denoted by reference "rp" is a pitch circle.

As has been mentioned hereinabove, the door proper 12 is driven by the two partial gears 20. However, if the door proper 12 has a relatively long lateral length, it tends to occur that the door proper becomes deformed when applied with a marked wind pressure.

This deformation is undesirable when considering the necessity of assured meshing of the gears and satisfied temperature controlling by the door proper 12. Thus, as is shown in FIG. 8, an arrangement is provided wherein a laterally middle portion of the door proper 12 is supported by a roller 24 for suppressing such undesired deformation.

In this case, the roller 24 comprises a drum-like portion 24a and a pair of resilient supporting arms 24b which are projected axially in opposite directions from the drum-like portion 24a. For installing the roller 24 in the case, a preferable arrangement is such that the supporting arms 24b are put in a recess 26 formed in a center connecting portion 25 integrally connected to an upper supporting wall of the heater core 4, and the drum-like portion 24a is arranged to project by a certain degree from the center connecting portion 25 thereby to resiliently contact with the door proper 12.

The center connecting portion 25 is arranged in a downstream portion in the air flow passage with respect to the door proper 12, that is, in a generally center portion of the case C. More specifically, the center connecting portion 25 includes cylindrical portions each having a bottom, which is projected from respective side walls of the case members C1 and C2 toward the axes of the air passages 10 and 11. That is, when the case members C1 and C2 are coupled in a so-called back-to-back connecting manner, the bottoms of the cylindrical portions are connected to each other. With usage of connecting bolts or dove-tail connecting method, the case members are tightly coupled defining therein the center connecting portion.

The door proper 12 has the four guide rollers 18 respectively put in the upper and lower guide cam grooves 19, so that vertical sliding of the door proper 12 inevitably causes production of a dead space at a lateral center portion where the air flow is shut. Thus, when the above-mentioned center connecting portion 25 is provided in the dead space, the mechanical strength of the case C is increased and the air flow resistance is reduced as compared with a case wherein the center connecting portion 25 is arranged at a portion other than the dead space. Thus, desired air flow controlling is obtained inducing improvement in air temperature controlling.

Preferably, the arrangement of the supporting roller 24 is made by taking the dead space into consideration. That is, when, in case wherein the case members C1 and C2 are assembled in a back-to-back connecting manner, the supporting arms 24b of the supporting roller 24 are supported by the case members C1 and C2, both the formation of the air passages and the arrangement of the supporting roller are simultaneously achieved. That is, in this case, mounting of the supporting roller 24 is readily achieved and the dead space is effectively used.

In the following, operation of the embodiment will be described.

(Full-Hot mode)

In a full-hot mode of a heating mode, wherein cooled air is entirely heated and blown to the vehicle cabin, the door proper 12 takes an uppermost position as shown in FIG. 1, so that air which has been introduced by the intake unit and cooled by the cooler unit 1 is entirely passed through the heater core 4.

In this case, the drive device 23 is operated by receiving instruction signals from a controller (not shown), so that the partial gears 20 are rotated. Thus, the partial gears 20 meshed with the toothed portions 17 formed on the door proper 12 raise the door proper 12 along the cam grooves 19.

When the door proper 12 is raised up to a terminal position, the higher teeth 20a of the partial gears 20 are brought into engagement with the higher teeth 17a of the door proper 12. Upon this, the door proper 12 is pressed backward by the partial gears 20 and driven backward along the cam grooves 19 having the seal member 15 pressed against the partition wall 13 of the case C.

As a result, the sealing of the door proper 12 is assured suppressing undesired air leakage, and thus, excellent air temperature controlling is obtained. Furthermore, since the door movement is carried out by the gear mechanism, smoothed door operation and easy door handling are obtained without suffering from noises.

(Hot mode)

In a hot mode in a cooling/heating mode, wherein cooled air and warmed air are mixed before being blown to the vehicle cabin, the door proper 12 takes a vertically middle position in FIG. 1, so that part of cooled air from the cooler unit 1 is forced to flow to the heater core 4 through an upper clearance defined above the door proper 12 and at the same time the remained part of the cooled air is forced to flow to the heater core 4 through a lower clearance defined below the door proper 12.

Also in this case, the drive device 23 is operated by the controller, so that due to rotation of the partial gears 20, the guide rollers 18 of the door proper 12 are moved along the guide cam grooves 19 carrying the door proper to the above-mentioned vertically middle position. Since this movement is carried out by only a contact between the guide rollers 18 and the cam grooves 19, the sliding resistance is very small and thus the movement is smoothly made. Furthermore, in this vertically middle position, the door proper 12 is stably held by the meshed engagement between partial gears 20 and the toothed portions 17 of the door proper 12 and thus displacement of the door proper does not occur. Even if such displacement takes place, the displacement would be only within a degree corresponding to a back lash which occurs between the partial gears 20 and the toothed portions 17 of the door proper 12, and thus, precise positioning of the door proper 12 is achieved.

The cooled air and warmed air are mixed to have a certain temperature and blown to the vehicle cabin.

(Full-cool mode)

In a full-cool mode of a cooling mode, wherein cooled air is entirely blown to the vehicle cabin without being heated, the door proper 12 takes a lowermost position in FIG. 1. Except this positioning of the door proper 12, substantially the same operation as that of the above-mentioned full-hot mode takes place. However, under this full-cool mode, it sometimes occurs that the passengers want a larger quantity of cooled air. In this case, it tends to occur that due to collision of the larger quantity of cooled air against the door proper 12, the door proper 12 whose width is relatively large becomes deformed or flexed in a downstream direction.

However, in case of the embodiment-1, the provision of the supporting roller 24 at the laterally middle portion of the door proper 12 can prevent such deformation of the door proper 12 even when the marked wind pressure is applied to the door proper 12. Due to the same reason, smoothed operation of the door is achieved without suffering from undesired gear slippage, and lowering in the temperature controlling performance, which would be caused by the deformation of the door proper 12, does not occur.

Furthermore, even if the door proper 12 is deformed due to a heat applied thereto from the evaporator 3 and the heater core 4 which are positioned near the door proper 12, the deformation of the door proper 12 can be minimized.

Since the supporting roller 24 is arranged to constantly support the door proper 12, the upward and downward movement of the door proper 12 along the curved path is smoothly carried out in not only the full-cool mode but also every other modes.

EMBODIMENT-2

Figure 9:
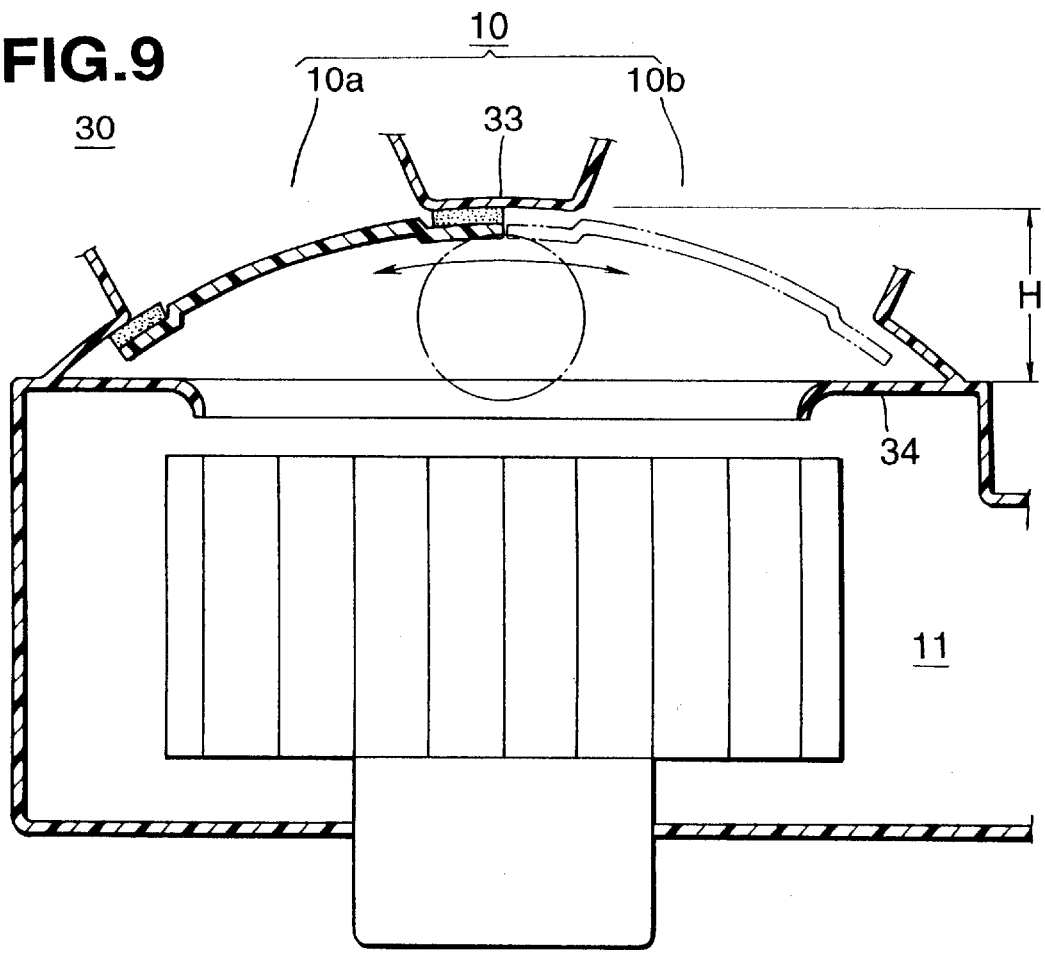
FIG. 9 is a sectional view of a second embodiment of the present invention.

FIG. 9 is a drawing showing essential portions of an automotive air conditioning device which is embodiment-2 of the present invention. Members and parts similar to those of FIGS. 1 to 8 are denoted by the same numerals.

As is shown in FIG. 9, a door mechanism of an automotive air conditioning device of the embodiment-2 is applied to an intake door.

An intake unit 30 associated with the embodiment-2 is a device which selectively intakes vehicle outside air (outside air) and vehicle inside air (inside air) and conditions the mixed air by flowing the same in an air conditioning device before blowing into the vehicle cabin. Like in the case of the above-embodiment, it is desirable to reduce a height "H" of an intake door D installed in the unit. In fact, flatten-shape of the intake door is preferable.

In the intake unit 30, air intake from the upstream air passage 10 is made by running a fan 31 via a motor 32. The upstream air passage 10 has an outside air intake passage 10a and an inside air intake passage 10b. The air flow running down from the upstream air passage 10 is led to the downstream air passage 11 which is communicated with a cooler unit corresponding to the cooler unit 1 of the embodiment-1. However, if desired, the cooler unit may be removed.

At upstream and downstream sides of the intake door D, there are arranged a partition wall 33 and a bell-mouth 34 which are located close to each other and serve as movement limiting structures "K" which restrict the movement of the door.

Accordingly, when the above-mentioned door D and the sliding mechanism M are applied to the intake unit 30, smoothed operation is expected while establishing a compact structure of the unit. Furthermore, sealing performance and temperature controlling performance are increased without suffering from noises, which allows production of an excellent door mechanism.

Since the door D and the sliding mechanism M are the same as those of the above-mentioned embodiment-1, explanation of them will be omitted.

The present invention is not limited to the above-mentioned embodiments-1 and -2. That is, various modifications within the concept of the present invention may be thought out.

For example, a door to which the door mechanism of the invention is applied is not limited to the intake door or the mix door. That is, the door mechanism may be applied to other doors. In known automotive air conditioning devices, the defroster opening 6a and the ventilation opening 7a are located close to each other. The invention can be applied to the defroster door 6 and the ventilation door 7.

The above-mentioned door is described to have an arcuate shape. However, if desired, the door may have a flat shape. Furthermore, the shape of teeth of the partial gears and the shape of the teeth of the toothed portions of the door proper are not limited to those of the illustrated embodiments. That is, the shape of them can be freely changed as the need arises.

Figure 10:
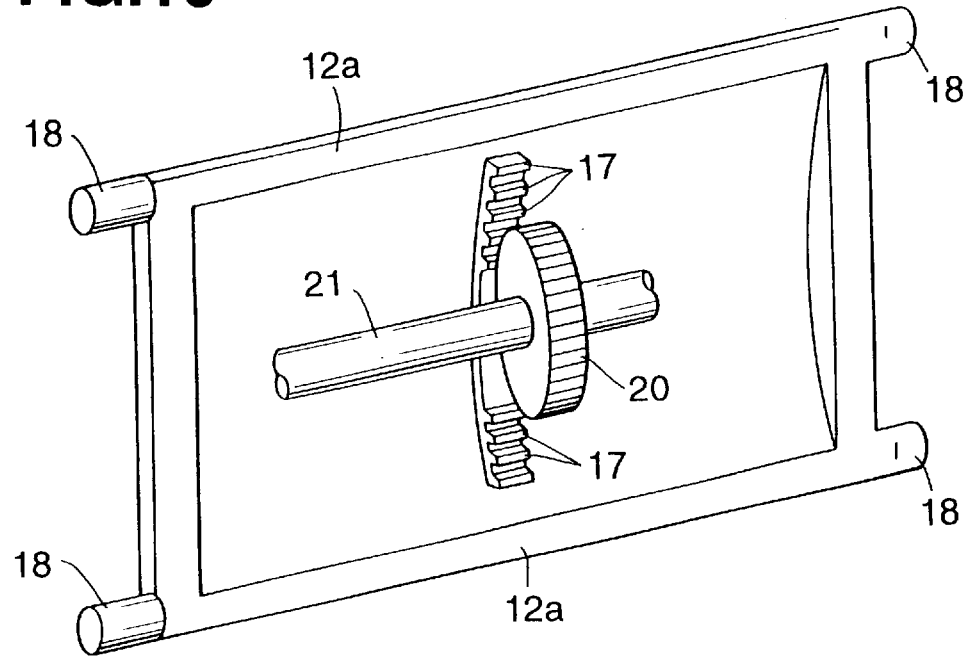
FIG. 10 is a schematic perspective view of another door employable in the present invention.

In the above-mentioned embodiments, the door proper 12 is arranged to be moved by a pair of partial gears 20. However, if desired, as is shown in FIG. 10, only one gear 20 may be used, which is arranged at the center portion of the door proper 12 for moving the door proper. If such modification is practically employed, reduction in parts and much easier assembly are achieved thereby to obtain a reduced production cost. Furthermore, in cooperation with the supporting roller 24, the is gear 20 can support the door proper 12, and thus, even if the door proper is somewhat deformed, the deformation has substantially no influence on the temperature controlling performance.

EMBODIMENT-3

Figure 11:
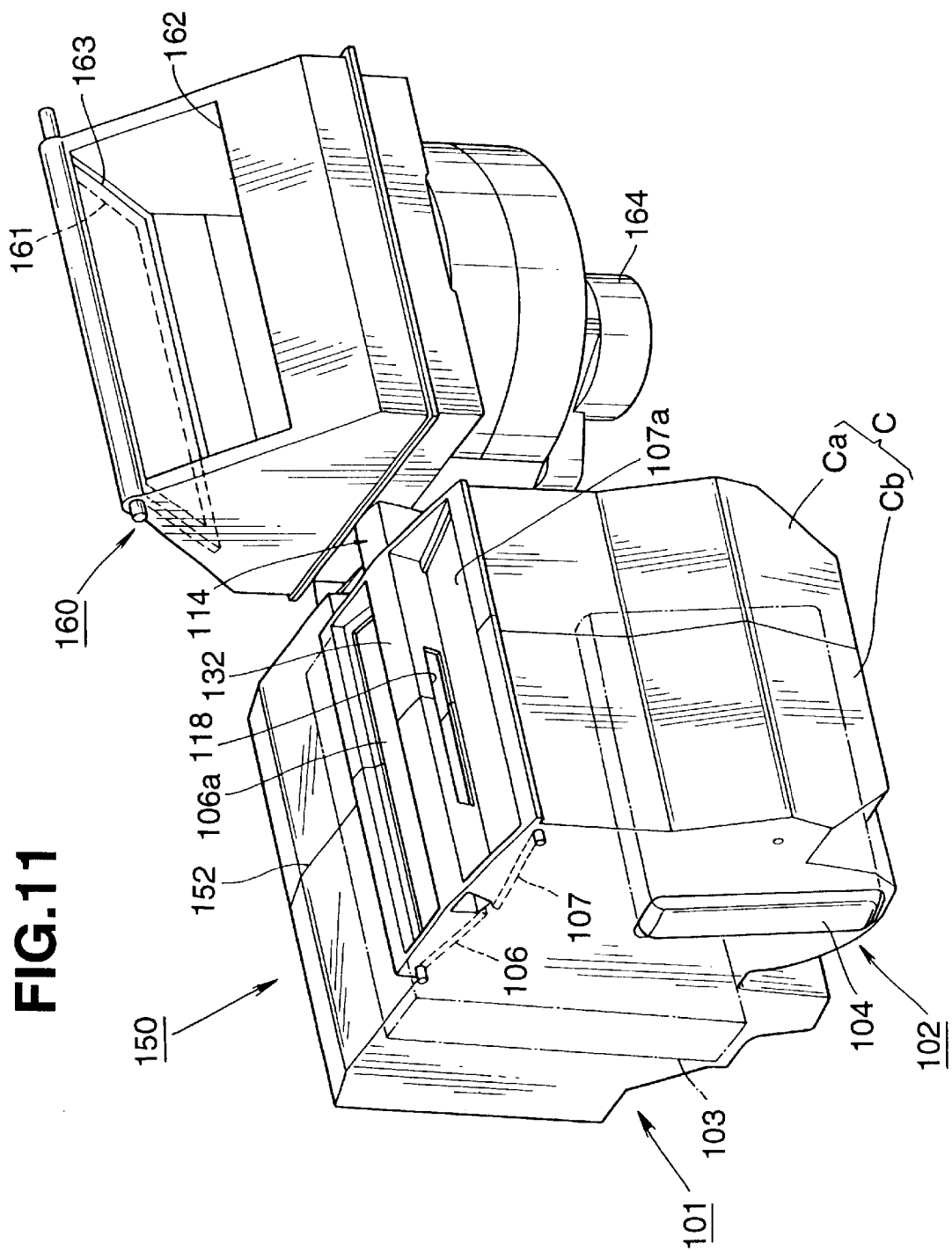
FIG. 11 is a perspective view showing an automotive air conditioning device of a third embodiment of the present invention and an intake unit.

As is shown in FIG. 11, an automotive air conditioning device of this embodiment is connected to an intake unit 160 which, after introducing the outside or inside air, leads the air to a downstream portion. The intake unit 160 is formed with both an outside air intake port 161 for introducing the outside air and an inside air intake port 162 for introducing the inside air for the air circulation. Selection of the ports 161 and 162 is made by an intake door 163. In order to forcibly transfer the air from the intake port 161, the intake port 162 or both of them to the downstream portion, there is arranged a fan which is driven by a motor 164 installed in the intake unit.

The automotive air conditioning device 150 comprises a case C which is integral with a frame of the cooler unit 101 and a frame of the heater unit 102. In an upstream part of an air passage of the case C, there is arranged an evaporator 103 which is connected to a refrigerating cycle (not shown). The introduced air is cooled when passing through the evaporator 103. In a downstream part of the air passage, there is arranged a heater core 104 in which engine cooling water flows. The evaporator is not always necessary. That is, such evaporator is not installed in air conditioners for motor vehicles designed for use in cold areas.

The air flow running down from an opening 165 defined at the connecting portion to the intake unit 160 is controlled by a mix door D which is arranged at a space between the evaporator 103 and the heater core 104, the mix door being driven by a sliding mechanism M. With this control, the air flow is selectively led to either one of a hot air flowing passage "H" in which the heater core 104 is installed and a bypass passage "B" which bypasses the hot air flowing passage "H" and the heater core 104. Or with that control, the air is led into both the hot air flowing passage "H" and the bypass passage "B" at a certain distribution ratio. At upstream and downstream sides of the mix door D, there are closely arranged the evaporator 103 and the heater core 104, by which compact arrangement is achieved.

The mix door D has, at a portion defined between the evaporator 103 and the heater core 104, a door proper 112 which extends in a direction to shut the air flow. As is seen from FIG. 12, the vertical length of the door proper 112 is about half that of an open area of a partition wall 113 by which the upstream air passage and the downstream air passage are partitioned, and as is seen from FIG. 13, the lateral length of the door proper is generally equal to the distance between opposed sides of the case C. At opposed side portions of the door proper 112, there are formed respective toothed portions 117 which are meshed with partial gears 120 which are driven by a drive device 123, each toothed portion having teeth which extend vertically. The drive device 123 is a motor, a motor actuator or a manually operated device. The drive device 123, the partial gears 120 and the toothed portions 117 constitute a sliding mechanism "M" for driving the door "D".

At a downstream side of the heater core 104, there is defined a mixing chamber "E". That is, the air passing through the heater core-mounted hot air passage "H" and the air passing through the bypass passage "B", which are distributed at a certain distribution ratio, are led into and mixed in the mixing chamber "E" and conditioned therein. A ventilation opening 107a is provided, to which a ventilation duct from the mixing chamber "E" is connected for blowing air against an upper portion of a passenger in the vehicle cabin. A ventilation door 107 for opening and closing the ventilation opening 107a is arranged to pivot about a pivot axis 107b. Furthermore, a defroster opening 106a is provided, through which the air from the mixing chamber "E" is blown against a front glass window. A defroster door 106 for opening and closing the defroster opening 106a is arranged to pivot about a pivot shaft 106b. Similar to this, a foot opening 108a is provided, through which the air is blown against feet of the passenger, and a foot door 108 is provided, which opens and closes the foot opening 108a. Accordingly, the conditioned air in the mixing chamber "E" is selectively blown into the vehicle cabin through the ventilation opening 107a, the defroster opening 106a and the foot opening 108a which are formed in the case "C".

Figure 14:
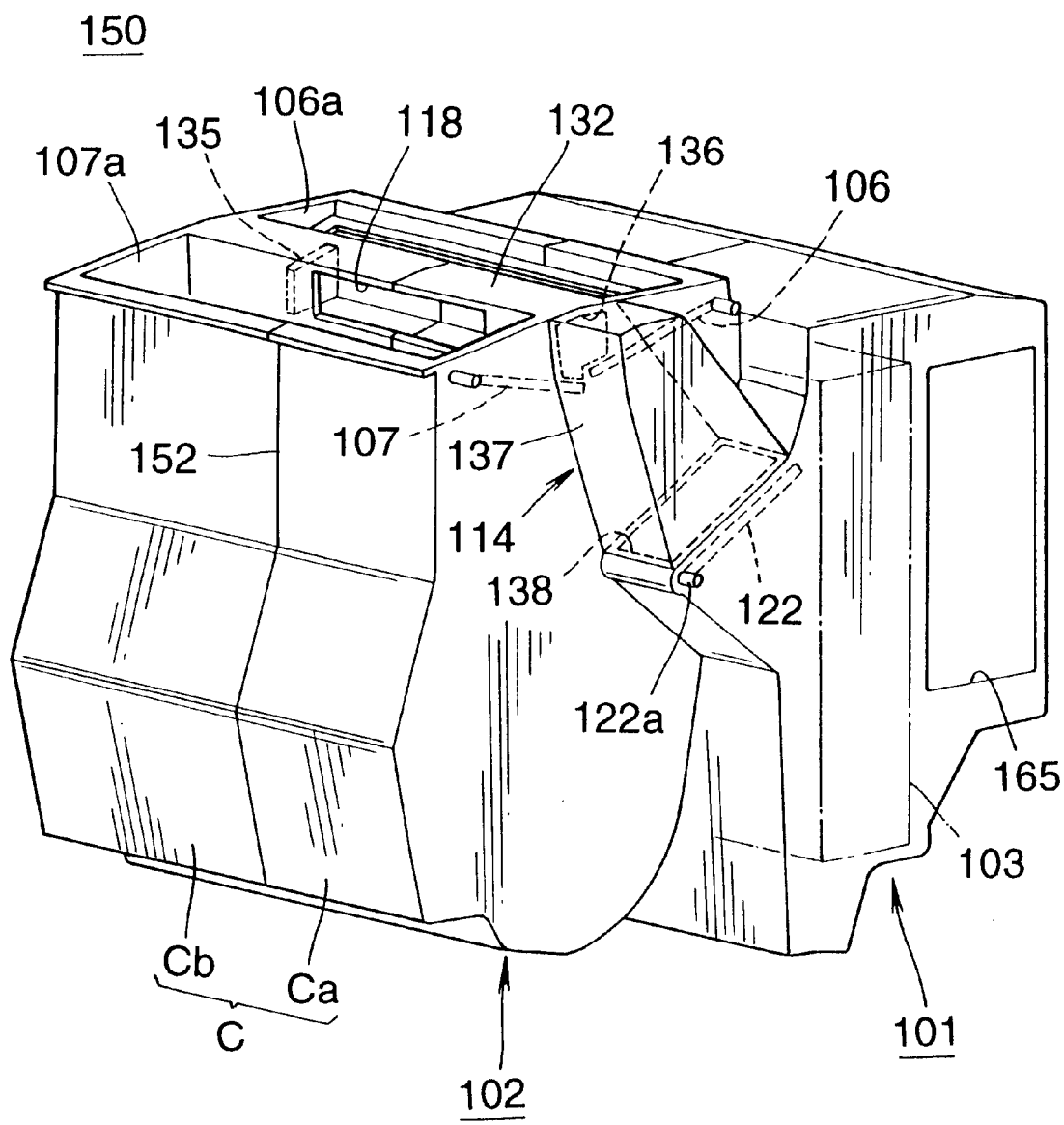
FIG. 14 is an external appearance of the automotive air conditioning device of FIG. 11, which is taken from a right side of FIG. 11.
Figure 15:
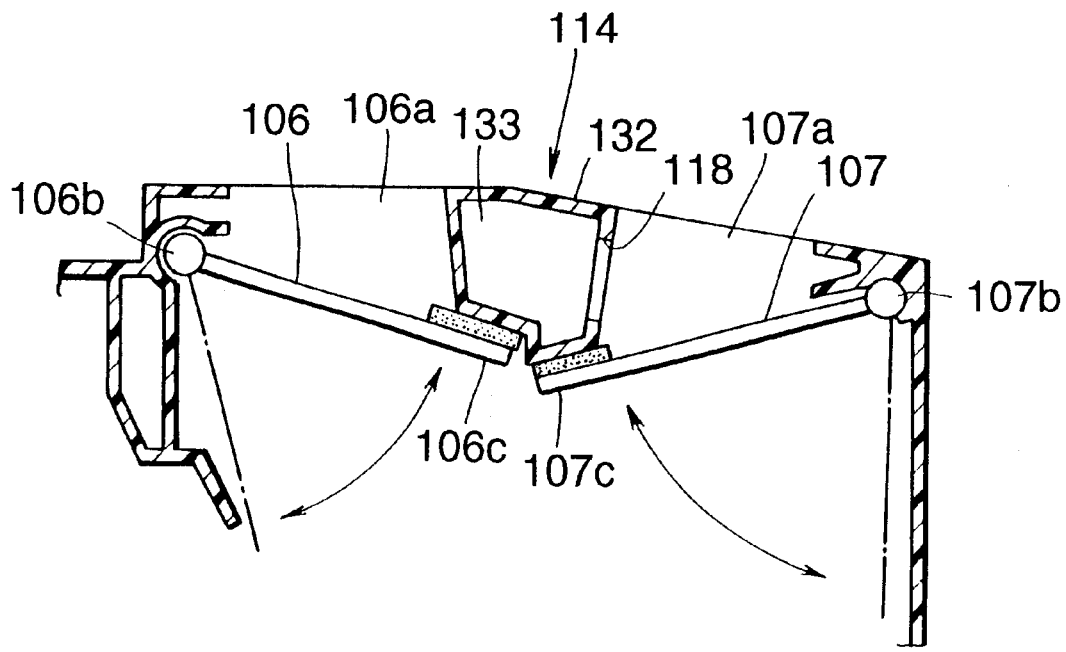
FIG. 15 is an enlarged sectional view of a portion where a ventilation door and a defroster door are arranged.

FIG. 14 is an outside view of the automotive air conditioning device 150 shown in FIG. 11, which is taken from a right side of the illustrated device. FIG. 15 is an enlarged sectional view of an area where the ventilation door and the defroster door are arranged.

In this embodiment, as shown in the drawings, part of the air passing through the evaporator 103 is directly led to the ventilation duct of the ventilation opening 107a without flowing in the hot air passage "H" and the bypass passage "B". For this flow, a cooled air passage 114 is provided. Although not shown in the drawings, similar to the arrangement of FIG. 20, the ventilation duct 116 is connected to the ventilation opening 107a, and the other end of the ventilation duct 116 is divided into two, one being connected to a center ventilation air outlet 121a from which the air is blown to a center portion of the vehicle cabin and the other being connected to a side ventilation air outlet 121b from which the air is blown to a left or right side of the vehicle cabin. Accordingly, the air flow led into the ventilation duct 116 is forced to run toward an upper portion and change its flowing direction toward the right and left portions, and thus the air is blown to upper portions of the passengers from the ventilation openings 121a and 121b.

As is seen from FIG. 15, when the ventilation opening 107a and the defroster opening 106a are closed by the ventilation door 107 and the defroster door 106, free end portions of the doors 107 and 108, which are defined at opposed portions with respect to the pivot shafts 107b and 106b, are brought into abutment with a contacting portion 132. This contacting portion 132 has a hollow portion 133 defined therein, which constitutes part of the cooled air flowing passage 114.

In a side surface of the contacting portion 132, there is formed a ventilation duct connecting opening 118 through which the hollow portion 133 and the ventilation duct 116 are connected. The ventilation duct connecting opening 118 has a center axis along which the air from the ventilation opening 107a flows, and the length of the opening 118 as measured in a direction perpendicular to the center axis is smaller than that of the ventilation opening 107a, and the opening 118 is positioned to face a middle portion of the ventilation opening 107a. With this arrangement, the cooled air from the hollow portion 133 is smoothly run with the aid of the air flow running in the unit along the ventilation door 107. Furthermore, the air passing through the ventilation duct connecting opening 118 can be blown out toward a center portion of the vehicle cabin mainly from the center ventilation air outlet 121a, and thus, effective air blowing is achieved. Accordingly, from the center ventilation air outlet 121a, there is blown out the cooled air, and from the side ventilation air outlets 121b, there is blown out relatively high temperature air to remove frost from the side glass windows.

If the position of the ventilation duct connecting opening 118 is appropriately determined, it becomes possible to have the air blown from both the center ventilation air outlet 121a and the side ventilation air outlets 121b. If desired, numerous ventilation duct connecting openings 118 may be provided, and if desired, the ventilation duct connecting opening 118 may have a longitudinal length equal to that of a ventilation opening 112.

At a downstream portion of the hollow portion 133 which is positioned downstream of the ventilation duct connecting opening 118, there is provided an air shutting plate 135, so that the air passing through the hollow portion 133 can be effectively led to the ventilation duct connecting opening 118.

While, at an end in the hollow portion opposite to the air shutting plate 135, there is formed an opening 136 to which an end of an auxiliary duct 137 is connected. The other end of the auxiliary duct 137 is connected to a fresh ventilation opening 138 which is provided at a portion in the case "C" downstream of the evaporator 103. The fresh ventilation opening 138 is formed in one side wall of the case "C", into which part of the air passing through the evaporator 103 is led. The fresh ventilation door 122 for opening and closing the fresh ventilation opening 138 is arranged to pivot about a pivot shaft 122a.

As is described hereinabove, the cooled air passage 114 comprises the auxiliary duct 137 and the hollow portion 133. Accordingly, by controlling the open/close movement of the fresh ventilation door 122, the ventilation openings 121a and 121b which have openings directed to the vehicle cabin can supply to the vehicle cabin cooled air and air having a temperature different from that of the cooled air, respectively. That is, a so-called fresh ventilation mode is established.

The case "C" comprises a first case segment "Ca" which is of a split structure including right and left parts joined at vertical mating surfaces 152 which extend along the direction in which the air from the ventilation opening 107a flows, and a second case segment "Cb" which is bonded to the first case segment "Ca". The vertical mating surfaces 152 are arranged to pass through the above-mentioned ventilation duct connecting opening 118. Thus, by providing rectangular cuts in the vertical mating surfaces 152 of the case segments "Ca" and "Cb" and the joining these case segments "Ca" and "Cb" at the mating surfaces, the ventilation duct connecting opening 118 is easily formed.

Furthermore, by leaving a certain clearance between molds when producing the second segment "Cb" by molding, the air shutting plate 135 is easily produced. Furthermore, since parts of the molds by which the certain clearance is defined can be reduced in length, the molds can have a longer life. In addition to this, the rigidity of the molds can be increased.

In the following, operation will be described.

Figure 12:
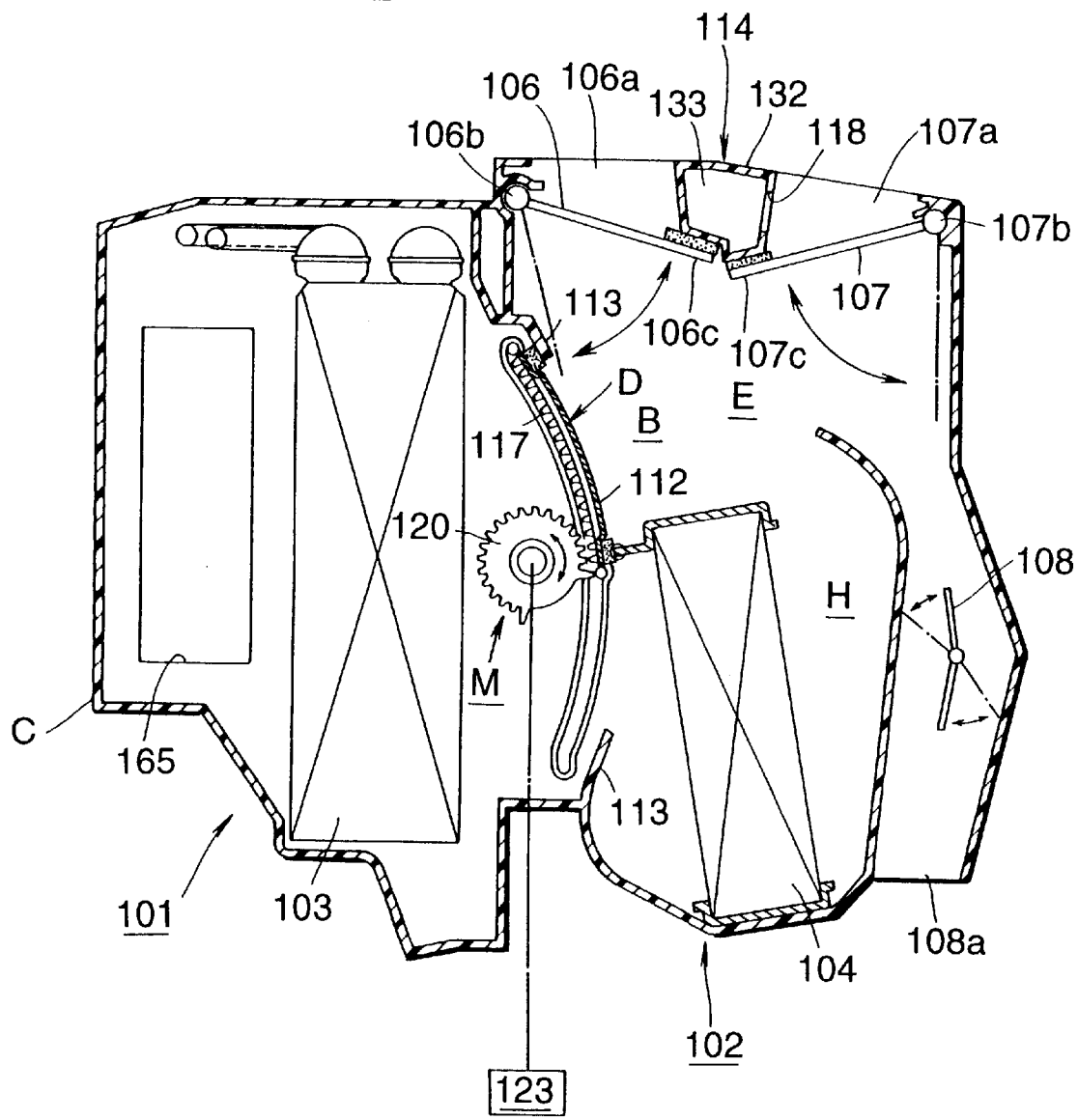
FIG. 12 is a vertically sectional view of an automotive air conditioning device of the invention.
Figure 13:
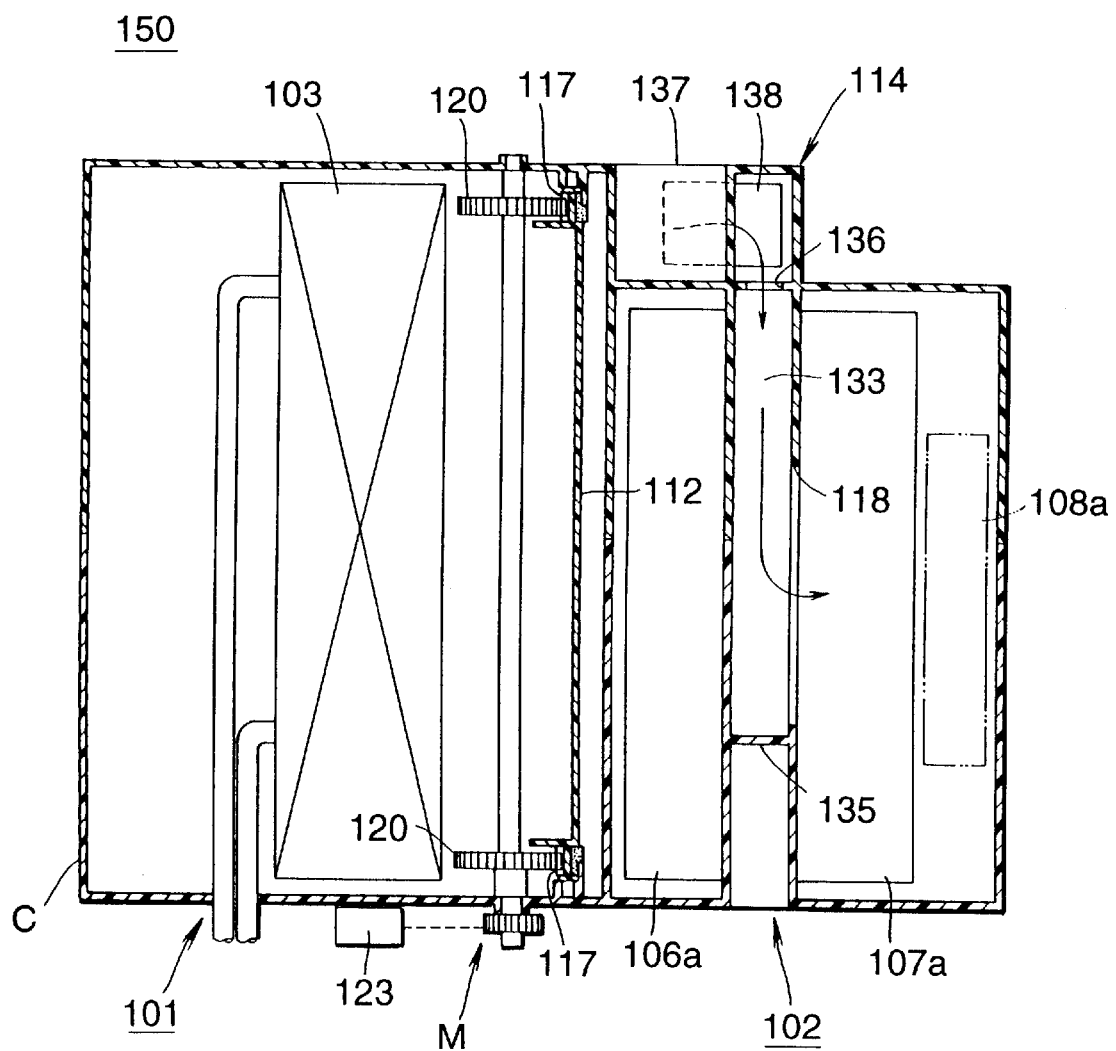
FIG. 13 is a horizontally sectional view of the automotive air conditioning device of the invention.

In the full-hot mode of the heating mode, wherein cooled air is entirely heated and blown to the vehicle cabin, the door proper 112 takes an uppermost position as shown in FIG. 12, so that air which has been introduced by the intake unit 160 and cooled by the evaporator 103 is entirely passed through the heater core 104.

In the full-cool mode of a cooling mode, wherein cooled air is entirely blown into the vehicle cabin without being heated, the door proper 112 takes a lowermost position. Except this positioning of the door proper, substantially the same operation as that of the above-mentioned full-hot mode takes place.

While, in a temperature control mode of a cooling/heating mode, wherein cooled air and heated air are mixed to provide air having a desired temperature and the air is blown into the vehicle cabin, the door proper 112 takes a vertically middle position in FIG. 12, so that part of cooled air form the cooler unit 160 is forced to flow through an upper space defined above the door proper 112 and at the same time the remaining part of the cooled air is forced to flow through the heater core 104.

In the temperature control mode, upon receiving an instruction signal from a controller, a fresh air ventilation mode is established. This fresh air ventilation mode may be manually established by a passenger handling a fresh air ventilation switch (not shown). With this, the flesh air ventilation door 122 is pivoted to a certain angular position thereby to open the fresh air ventilation opening 138.

In the temperature control mode, the cooled air which has passed through the evaporator 103 and the bypass passage "B" and the hot air which has passed through the hot air flowing passage "H" are mixed in the mixing chamber "E" at a given mixing ratio, and then the air thus conditioned in temperature is forced to flow in the ventilation opening 107a and the ventilation duct 116 to be blown into the vehicle cabin from the ventilation air outlets 121a and 121b.

While, part of the cooled air coming from the evaporator 103 is forced to flow in the cooled air passage 114 and the ventilation duct connecting opening 118 and directly led to the ventilation duct 116 without passing through the bypass passage "B" and the hot air passage "H".

Accordingly, by establishing the fresh air ventilation mode, the above-mentioned temperature controlled air is added with the cooled air coming from the cooled air passage 114, so that the temperature controlling characteristic exhibited at the time when the mix door "D" is in the vertically middle position is directed toward a lower temperature side.

When cancellation of the fresh air ventilation mode is needed, the fresh ventilation door 122 is pivoted in a direction to close the fresh ventilation opening 138. With this, the air coming from the evaporator 103 is suppressed from passing through the cooled air passage 114, and the cooled air passing through the bypass passage "B" and the hot air passing through the hot air passage "H" are mixed in the mixing chamber "E" at a given mixing ratio and then blown into the vehicle cabin.

As is described hereinabove, in this embodiment, when the ventilation opening 107a and the defroster opening 106a are respectively closed by the ventilation door 107 and the defroster door 106, opposed ends 107c and 106c of these doors 107 and 106 with respect to the pivot shafts 107b and 106b are brought into abutment with a contacting portion 132. This contacting portion 132 is constructed to have therein the hollow portion 133 which constitutes the cooled air passage 114 through which the introduced air is directly led into the ventilation duct 116. Thus, part of the cooled air running downstream is led to the ventilation duct 116 through the hollow portion 133 and the ventilation duct connecting opening 118. Thus, it is possible to provide an automotive air conditioning device which is very simple in construction, low in cost and compact in size and has a fresh ventilation mode. In addition to this, due to the box-like structure, the contacting portion 132 can have an increased rigidity and thus assure sealing of the doors. Furthermore, the rigidity of the assembled case is increased.

Figure 16:
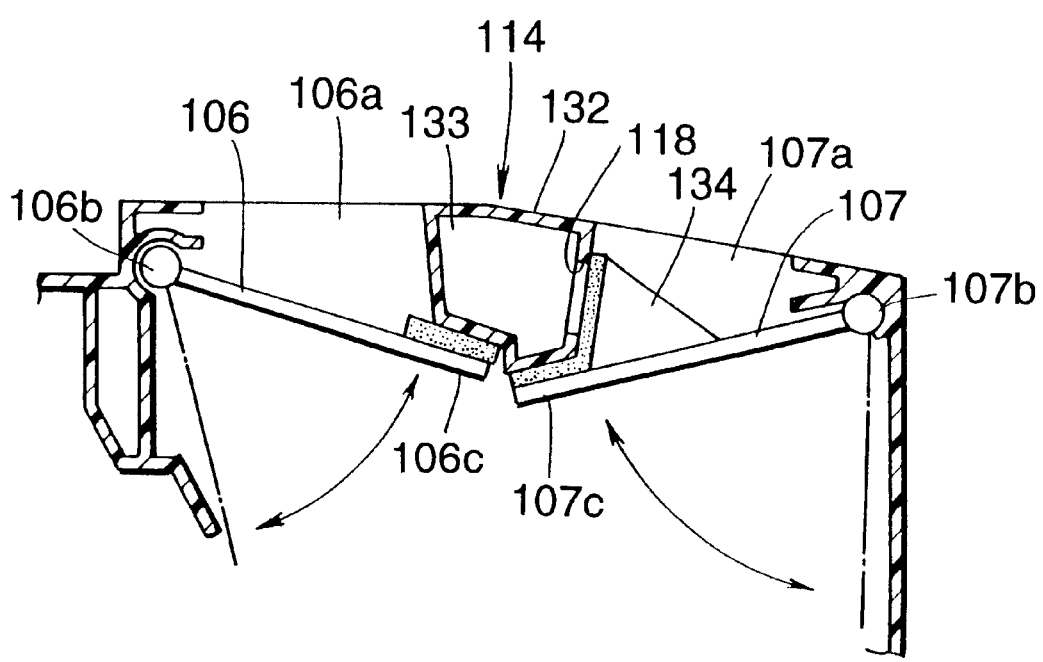
FIG. 16 is an enlarged sectional view of a ventilation door and its peripheral portion which are employed in another embodiment.

FIG. 16 is an enlarged sectional view of a part of still another embodiment, where the ventilation door and its neighboring parts are arranged. In this embodiment, unlike the above-mentioned embodiment of FIG. 15, a projected portion 134 is provided on an outer surface of the ventilation door 107, which closes the ventilation duct connecting opening 118 when the ventilation door assumes a position to close the ventilation opening 107a. With this arrangement, the ventilation door 107 can open and close the ventilation duct connecting opening 118 by itself. That is, in a case wherein the ventilation opening 107a is closed by the ventilation door 107, the cooled air passing through the cooled air passage 114 and the evaporator 103 is suppressed from being blown from the ventilation air outlet into the vehicle cabin. While, when the ventilation door 107 is opened even slightly, cooled air is assuredly obtained from the cooled air passage 114. Accordingly, the fresh ventilation door 122, which is employed in the above-mentioned embodiment for opening and closing the fresh ventilation opening 138 provided at the cooled air passage 114, can be omitted.

Figure 17:
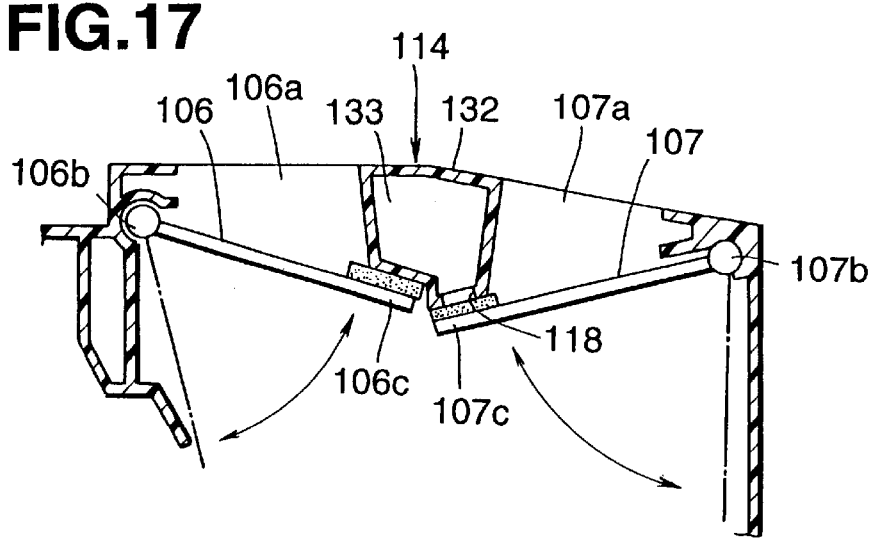
FIG. 17 is an enlarged sectional view of a ventilation door and its peripheral portion which are employed in a further embodiment.

FIG. 17 is an enlarged sectional view of a part of a further embodiment, wherein the ventilation door and its neighboring parts are arranged. In this embodiment, unlike the above-mentioned embodiment of FIG. 15, the ventilation duct connecting opening 118 is provided at a position which is contacted or closed by the terminal end 107c of the ventilation door 107 when the ventilation door 107 assumes a position to close the ventilation opening 107a. With this arrangement, substantially same advantages as those of the above-mentioned embodiment of FIG. 16 are obtained without aid of the projected portion 134 on the ventilation door 107, and thus a simple structure is obtained from this embodiment.

It is to be noted that above-mentioned embodiments are not provided for limiting the present invention. That is, in the invention, various modifications are possible.

In the above-mentioned embodiments, the cooler unit 101 is provided. However, such cooler unit is not always necessary. That is, the present invention is applicable to an automotive air conditioning device which has no a cooler unit installed at the time when the device is shipped. In the motor vehicles used in cold areas, there is a type having no evaporator in the air conditioning device.

Figure 20:
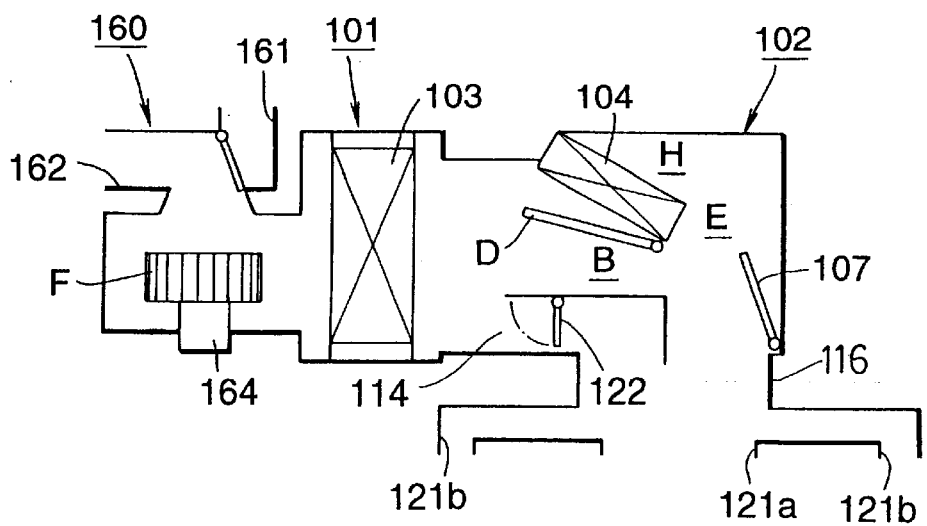
FIG. 20 is a sectional view of a further conventional automotive air conditioning device.

In the above-mentioned embodiments, the mix door "D" is arranged to slide upward and downward for adjusting the open degree. However, if desired, as is shown in FIG. 20, the invention is applicable to automotive air conditioning devices of a type having a door which is turned about a shaft to adjust the open degree.

In the above-mentioned embodiments, the fresh ventilation opening 138 is positioned downstream of the mix door "D", and in the full-hot mode wherein the door proper 112 of the mix door "D" is in its uppermost position, the cooled air from the evaporator 103 is prevented from entering the cooled air passage 114. This arrangement aims to adjust the temperature control. However, as is shown in FIG. 20, the present invention is applicable to automotive air conditioning devices of a type wherein the cooled air passage 114 is arranged at a portion isolated from the area which is opened and closed by the mix door. Operation of this modification will be described with reference to FIGS. 12 and 14. That is, for example, when, in the heating mode, it is needed to apply cooled air to passengers while removing frost from the front glass window, the defroster opening 106a is opened, the mix door "D" is raised to the position to close the bypass passage "B" and the fresh ventilation door 122 is pivoted to the position to open the fresh ventilation opening 138. Upon this, part of the air coming from the evaporator 103 is led into the ventilation duct 116 through the cooled air passage 114 and the ventilation duct connecting opening 118, and at the same time, the hot air heated by the heater core 104 is led to the defroster opening 106a and then to a defroster duct (not shown) to be blown against the front glass window. Thus, the air is blown against the passengers while removing frost from the front glass window. With this, comfortable air conditioning is achieved while suppressing the passenger to feel hot at his or her head portion. Furthermore, from the side ventilation air outlet 121b shown in FIG. 20, relatively high temperature air is blown against the side glass window to remove frost from the glass window thereby obtaining satisfied view of a side mirror. Furthermore, from the center ventilation air outlet 121a, cooled air is blown out toward the passenger to suppress the passenger to feel hot at his or her head portion, which brings about a comfortable air conditioning in the vehicle cabin.

What is claimed is:

1. A door mechanism of an automotive air conditioning device including one upstream air passage, two downstream air passages branched from said upstream side passage, a door having a predetermined size and arranged to select one of the two downstream air passages for feeding an air flow from said upstream air passage to a selected downstream air passage or arranged to distribute the air flow to both the downstream air passages at a given distribution ratio, movement limiting structures arranged at upstream and downstream sides of the door near the door, and a door mechanism comprising:

a door proper which forms part of said door, said door proper being arranged between the movement limiting structures and to extend in a direction to shut off the air flow from the upstream air passage, and a seal member which is bonded to one surface of said door proper, said door proper being capable of sliding in a direction to shut off the air flow with the aid of a sliding mechanism, said sliding mechanism having:

a gear meshed with a toothed portion formed on said door proper, so that when, upon operation of a driving device, the gear is driven, said door proper is slid in the sliding direction and when the door proper comes to a terminal end of the sliding path, said door proper is moved in a direction angled to said sliding direction, so that said seal member is contacted to and pressed against a contacting member formed on a case which has said air passages defined therein, said seal having a flat surface which is contactable with the contacting member; and wherein said sliding mechanism comprises:

cam grooves which are formed on both side surfaces of said case which has said air passages defined therein, and a plurality of guide members provided on end portions of said door proper and slidably received in said cam grooves, each of said cam grooves having at a terminal end portion thereof a portion by which an associated guide member is guided in a direction angled to the sliding direction of the door proper, and wherein said seal member is pressed against said contacting member when said door proper comes to said terminal end portion.

2. A door mechanism of an automotive air conditioning device including one upstream air passage, two downstream air passages branched from said upstream side passage, a door having a predetermined size and arranged to select one of the two downstream air passages for feeding an air flow from said upstream air passage to a selected downstream air passage or arranged to distribute the air flow to both the downstream air passages at a given distribution ratio, movement limiting structures arranged at upstream and downstream sides of the door near the door, and a door mechanism comprising:

a door proper which forms part of said door, said door proper being arranged between the movement limiting structures and which extends in a direction to shut off the air flow from the upstream air passage, and a seal member which is bonded to one surface of said door proper, said door proper being capable of sliding in a direction to shut off the air flow with the aid of a sliding mechanism, said sliding mechanism having:

a gear meshed with a toothed portion formed on said door proper, so that when, upon operation of a driving device, the gear is driven, said door proper is slid in the sliding direction and when the door proper comes to a terminal end of the sliding path, said door proper is moved in a direction angled to said sliding direction, so that said seal member is contacted to and pressed against a contacting member formed on a case which has said air passages defined therein; said gear of said sliding mechanism having higher teeth which are higher than other teeth, so that when said driving device drives said gear, said higher teeth, press said sealing member against said contacting member through a toothed portion formed on said door proper.

3. A door mechanism of an automotive air conditioning device as claimed in claim 2, which is characterized in that said door proper (12) is supported by a supporting roller (24) which is fixed and positioned at a laterally middle portion of said door proper, said supporting roller resiliently contacting said door proper.

4. A door mechanism of an automotive air conditioning device as claimed in claim 2, which is characterized in that said door proper (12) has an arcuate cross section so that the door proper is can contact the gear (20) driven by said driving device (23).

5. A door mechanism of an automotive air conditioning device as claimed in claim 2, which is characterized in that said air passages (10, 11) are provided by coupling a pair of case members (C1, C2) having said door proper (12) put therein, and in that said air passages have, at a downstream portion of said door proper (12) and at a middle portion of the path along which said door proper (12) slides, a center connecting portion (25) by which said case members (C1, C2) are connected.

6. A door mechanism of an automotive air conditioning device as claimed in claim 5, which is characterized in that said supporting roller (24) is connected to said center connecting portion (25).

7. An air conditioning device comprising:

a case having therein an upstream air passage and two downstream air passages which are separated from a downstream end of said upstream air passage;

an evaporator arranged in said upstream air passage;

a heater core arranged in one of said two downstream air passages; and a door mechanism including:

a door sliding mechanism which is arranged immediately before inlet portions of said two downstream air passages, a door proper which is slidingly guided by said door sliding mechanism in a manner to vary a ratio of opening area between the inlet portions of said two downstream passages, a seal member which is attached to a downstream surface of said door proper, contacting portions which respectively constitutes the inlet portions of said two downstream air passages and which are respectively contactable with said seal member when said door proper assumes predetermined terminal positions, a toothed rack portion which is formed on an upstream surface of said door proper, a gear which is arranged in said upstream air passage and meshed with said toothed rack portion and a driving device which rotates said gear, wherein said gear has higher teeth which are higher than other teeth on said gear, so that when, due to rotation of said gear, said door proper is slid to one of the predetermined terminal positions, said door proper is shifted toward said inlet portions of said two downstream air passages by the higher teeth thereby pressing said sealing member against said contacting member.

8. An air conditioning device as claimed in claim 1, in which said door proper of said door mechanism has an arcuate cross section and is arranged in such a manner that a concave surface thereof faces the upstream air passage.

9. An air conditioning device as claimed in claim 8, in which said door mechanism further comprises a supporting roller which is held in said case and resiliently pressed against a convex downstream surface of said door proper.

10. An air conditioning device as claimed in claim 8, in which said door sliding mechanism of said door mechanism comprises:

cam grooves formed in opposed inner surfaces of said case;

a plurality of guide members provided on lateral ends of said door proper and slidably received in said cam grooves respectively.

11. An air conditioning device as claimed in claim 10, in which each of said cam grooves has an angled leading end which is angled toward said contacting portion.

12. An air conditioning device comprising:

a case having therein an upstream air passage and first and second downstream air passages;

first and second sets cam grooves formed in opposed inner surfaces of said case, the first set being disposed on either side of an opening of the first downstream passage, and the second set being disposed on either side of an opening of the second downstream passage, the terminal ends of each of cam groove having a curved portion which is angled toward the openings of the first and second downstream passages;

a door having a first end supported in the first set of cam grooves by way of a first set of guide members and a second end supported in the second set of cam grooves by way of a second set of guide members, the first and second sets of guide members being arranged on the door so that when the first set of guide members enter a pair of curved portions in one set of cam grooves, the second set of guide members enter a pair of curved portions in the other set of cam grooves; and a drive mechanism for moving the door along the first and second sets of slide grooves including:

a pinion gear having two sets of spaced elongate teeth which are longer than the remaining intervening teeth on the gear, and a rack rigid with the door, the rack having teeth at the terminal ends thereof which are adapted to cooperate with the spaced elongate teeth on the gear.

* * * * *